United States Patent
Zhang et al.

(10) Patent No.: US 11,516,572 B2
(45) Date of Patent: Nov. 29, 2022

(54) ACOUSTIC OUTPUT DEVICE

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 82 days.

(21) Appl. No.: 17/142,191

(22) Filed: Jan. 5, 2021

(65) Prior Publication Data
US 2021/0127200 A1    Apr. 29, 2021

Related U.S. Application Data

(63) Continuation of application No. PCT/CN2019/130944, filed on Dec. 31, 2019.

(30) Foreign Application Priority Data

Apr. 30, 2019   (CN) ......................... 201910364346.2
Sep. 19, 2019   (CN) ......................... 201910888067.6
Sep. 19, 2019   (CN) ......................... 201910888762.2

(51) Int. Cl.
  *H04R 1/10*     (2006.01)
  *H04R 1/02*     (2006.01)
  (Continued)

(52) U.S. Cl.
  CPC ........... *H04R 1/1016* (2013.01); *G02C 11/10* (2013.01); *G06F 3/16* (2013.01); *G06F 3/162* (2013.01);
  (Continued)

(58) Field of Classification Search
  CPC ........ H04R 1/105; H04R 1/1075; H04R 1/20; H04R 1/26; H04R 1/32; H04R 1/323; H04R 1/34; H04R 1/345; H04R 1/347
  See application file for complete search history.

(56) References Cited

U.S. PATENT DOCUMENTS 5,327,506 A    7/1994   Stites, III
5,572,594 A   11/1996   Devoe et al.
(Continued)

FOREIGN PATENT DOCUMENTS

CN           1270488 A    10/2000
CN         101022678 A     8/2007
(Continued)

OTHER PUBLICATIONS

International Search Report in PCT/CN2019/130880 dated Apr. 1, 2020, 6 pages.
(Continued)

*Primary Examiner* — Kile O Blair
(74) *Attorney, Agent, or Firm* — Metis IP LLC

(57) ABSTRACT

The present disclosure relates to an acoustic output device. The acoustic output device may include at least one acoustic driver and a supporting structure. The at least one acoustic driver may be configured to generate a sound and output the sound through at least two sound guiding holes. The supporting structure may be configured to support the at least one acoustic driver and dispose the at least two sound guiding holes on two sides of an auricle of a user, respectively.

20 Claims, 21 Drawing Sheets

(51) Int. Cl.
| | |
|---|---|
| *H04R 1/26* | (2006.01) |
| *H04R 1/44* | (2006.01) |
| *G06F 3/16* | (2006.01) |
| *H04M 1/03* | (2006.01) |
| *H04M 1/78* | (2006.01) |
| *H04R 1/24* | (2006.01) |
| *H04R 1/28* | (2006.01) |
| *H04R 3/02* | (2006.01) |
| *H04R 1/34* | (2006.01) |
| *H04W 4/80* | (2018.01) |
| *H04R 1/22* | (2006.01) |
| *H04R 3/00* | (2006.01) |
| *H04R 5/02* | (2006.01) |
| *G10L 21/038* | (2013.01) |
| *H04R 5/033* | (2006.01) |
| *H04S 7/00* | (2006.01) |
| *G02C 11/00* | (2006.01) |
| *H04R 1/38* | (2006.01) |
| *H04R 9/06* | (2006.01) |
| *G10L 21/0208* | (2013.01) |
| *G02C 11/06* | (2006.01) |
| *G10L 21/0216* | (2013.01) |

(52) U.S. Cl.
CPC .......... *G06F 3/165* (2013.01); *G10L 21/0208* (2013.01); *G10L 21/038* (2013.01); *H04M 1/03* (2013.01); *H04M 1/78* (2013.01); *H04R 1/02* (2013.01); *H04R 1/026* (2013.01); *H04R 1/028* (2013.01); *H04R 1/10* (2013.01); *H04R 1/105* (2013.01); *H04R 1/1008* (2013.01); *H04R 1/1025* (2013.01); *H04R 1/1041* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(56) References Cited

U.S. PATENT DOCUMENTS

| | | | |
|---|---|---|---|
| 6,062,337 A | 5/2000 | Zinserling | |
| 6,817,440 B1 | 11/2004 | Kim | |
| 8,891,800 B1 | 11/2014 | Shaffer | |
| 9,036,851 B2 | 5/2015 | Peng | |
| 9,794,676 B2 | 10/2017 | Shetye et al. | |
| 9,794,677 B2 | 10/2017 | Shetye et al. | |
| 9,838,787 B1 | 12/2017 | Jeffery et al. | |
| 9,949,030 B2 | 4/2018 | Sun et al. | |
| 9,985,596 B1 | 5/2018 | Litovsky et al. | |
| 10,231,052 B2 | 3/2019 | Jeffery et al. | |
| 10,375,479 B2 | 8/2019 | Graber | |
| 10,499,140 B2 | 12/2019 | Gong et al. | |
| 2006/0113143 A1 | 6/2006 | Ishida | |
| 2007/0098198 A1 | 5/2007 | Hildebrandt | |
| 2007/0223735 A1 | 9/2007 | Lopresti et al. | |
| 2007/0291971 A1 | 12/2007 | Halteren | |
| 2008/0101589 A1 | 5/2008 | Horowitz et al. | |
| 2009/0147981 A1 | 6/2009 | Blanchard et al. | |
| 2010/0310106 A1 | 12/2010 | Blanchard et al. | |
| 2011/0170730 A1 | 7/2011 | Zhu | |
| 2012/0177206 A1 | 7/2012 | Yamagishi et al. | |
| 2012/0263324 A1 | 10/2012 | Joyce et al. | |
| 2013/0051585 A1 | 2/2013 | Karkkainen et al. | |
| 2013/0108068 A1 | 5/2013 | Poulsen et al. | |
| 2013/0169513 A1 | 7/2013 | Heinrich et al. | |
| 2015/0049893 A1 | 2/2015 | Heidenreich et al. | |
| 2016/0119721 A1 | 4/2016 | Doshida et al. | |
| 2016/0127841 A1 | 5/2016 | Horii | |
| 2017/0195795 A1 | 7/2017 | Mei et al. | |
| 2017/0201823 A1 | 7/2017 | Shetye et al. | |
| 2017/0208395 A1 | 7/2017 | Wan et al. | |
| 2017/0230741 A1 | 8/2017 | Matsuo et al. | |
| 2017/0238096 A1 | 8/2017 | Nakagawa et al. | |
| 2017/0347192 A1* | 11/2017 | Seo ...................... H04R 5/0335 |
| 2017/0353780 A1 | 12/2017 | Huang et al. | |
| 2017/0353793 A1 | 12/2017 | Sun et al. | |
| 2017/0353796 A1 | 12/2017 | Jeffery et al. | |
| 2018/0048952 A1 | 2/2018 | Hong et al. | |
| 2018/0091883 A1 | 3/2018 | Howes et al. | |
| 2018/0167711 A1 | 6/2018 | Lin | |
| 2018/0227660 A1* | 8/2018 | Azmi ................... H04R 1/2849 |
| 2018/0271383 A1 | 9/2018 | Lee | |
| 2018/0367885 A1 | 12/2018 | Gong et al. | |
| 2018/0376231 A1 | 12/2018 | Pfaffinger | |
| 2019/0026071 A1 | 1/2019 | Tamaoki et al. | |
| 2019/0071011 A1 | 3/2019 | Konno et al. | |
| 2019/0104352 A1 | 4/2019 | Ozawa et al. | |
| 2019/0261080 A1 | 8/2019 | Gerber et al. | |
| 2020/0137476 A1 | 4/2020 | Shinmen et al. | |
| 2020/0169801 A1 | 5/2020 | Zhu | |
| 2020/0252708 A1 | 8/2020 | Zhu | |

FOREIGN PATENT DOCUMENTS

| | | |
|---|---|---|
| CN | 101098353 A | 1/2008 |
| CN | 201426167 Y | 3/2010 |
| CN | 103108268 A | 5/2013 |
| CN | 103179483 A | 6/2013 |
| CN | 103209377 A | 7/2013 |
| CN | 103260117 A | 8/2013 |
| CN | 203233520 U | 10/2013 |
| CN | 203301726 U | 11/2013 |
| CN | 204377095 U | 6/2015 |
| CN | 104869515 A | 8/2015 |
| CN | 104883635 A | 9/2015 |
| CN | 204810512 U | 11/2015 |
| CN | 204948328 U | 1/2016 |
| CN | 204948329 U | 1/2016 |
| CN | 205336486 U | 6/2016 |
| CN | 205510154 U | 8/2016 |
| CN | 205754812 U | 11/2016 |
| CN | 106231462 A | 12/2016 |
| CN | 106303779 A | 1/2017 |
| CN | 106341752 A | 1/2017 |
| CN | 106792304 A | 5/2017 |
| CN | 206193360 U | 5/2017 |
| CN | 107231585 A | 10/2017 |
| CN | 206575566 U | 10/2017 |
| CN | 206640738 U | 11/2017 |
| CN | 206865707 U | 1/2018 |
| CN | 107820169 A | 3/2018 |
| CN | 207075075 U | 3/2018 |
| CN | 207340125 U | 5/2018 |
| CN | 108650597 A | 10/2018 |
| CN | 108712695 A | 10/2018 |
| CN | 207939700 U | 10/2018 |
| CN | 109032558 A | 12/2018 |
| CN | 109151680 A | 1/2019 |
| CN | 208572417 U | 3/2019 |
| CN | 208675298 U | 3/2019 |
| CN | 109640209 A | 4/2019 |
| CN | 208783039 U | 4/2019 |
| EP | 2765788 A2 | 8/2014 |

(56) References Cited

FOREIGN PATENT DOCUMENTS

| EP | 3404931 A1 | 11/2018 |
|----|------------|---------|
| JP | H0993684 A | 4/1997 |
| JP | 2004343286 A | 12/2004 |
| KR | 20080103334 A | 11/2008 |
| WO | 0225990 A1 | 3/2002 |
| WO | 2005053351 A1 | 6/2005 |
| WO | 2015087093 A1 | 6/2015 |
| WO | 2016206764 A1 | 12/2016 |
| WO | 2018107141 A1 | 6/2018 |

OTHER PUBLICATIONS

International Search Report in PCT/CN2019/130B84 dated Mar. 20, 2020, 5 pages.
International Search Report in PCT/CN2019/130B86 dated Mar. 31, 2020, 6 pages.
International Search Report in PCT/CN2019/130944 dated Mar. 26, 2020, 6 pages.
International Search Report in PCT/CN2019/130921 dated Apr. 1, 2020, 6 pages.
International Search Report in PCT/CN2019/130942 dated Mar. 26, 2020, 6 pages.
International Search Report in PCT/CN2020/070540 dated Apr. 2, 2020, 6 pages.
International Search Report in PCT/CN2020/070550 dated Mar. 27, 2020, 6 pages.
International Search Report in PCT/CN2020/070545 dated Apr. 15, 2020, 6 pages.
International Search Report in PCT/CN2020/070551 dated Mar. 27, 2020, 7 pages.
International Search Report in PCT/CN2020/070542 dated Mar. 27, 2020, 6 pages.
International Search Report in PCT/CN2020/070539 dated Apr. 7, 2020, 6 pages.
International Search Report in PCT/CN2020/088190 dated Jul. 30, 2020, 6 pages.
International Search Report in PCT/CN2020/106759 dated Oct. 28, 2020, 6 pages.
International Search Report in PCT/CN2020/116319 dated Dec. 11, 2020, 6 pages.
International Search Report in PCT/CN2020/087002 dated Jul. 14, 2020, 4 pages.
Written Opinion in PCT/CN2020/087002 dated Jul. 14, 2020, 5 pages.
International Search Report in PCT/CN2020/087526 dated Jul. 23, 2020, 5 pages.
Written Opinion in PCT/CN2020/087526 dated Jul. 23, 2020, 4 pages.
International Search Report in PCT/CN2020/083631 dated Jun. 29, 2020, 4 pages.
Written Opinion in PCT/CN2020/083631 dated Jun. 29, 2020, 4 pages.
International Search Report in PCT/CN2020/087034 dated Jul. 22, 2020, 4 pages.
Written Opinion in PCT/CN2020/087034 dated Jul. 22, 2020, 5 pages.
Written Opinion in PCT/CN2020/088482 dated Aug. 5, 2020, 4 pages.
International Search Report in PCT/CN2020/088482 dated Aug. 5, 2020, 4 pages.
International Search Report in PCT/CNPCT/CN2020/084161 dated Jul. 6, 2020, 4 pages.
Written Opinion in PCT/CN2020/084161 dated Jul. 6, 2020, 4 pages.

* cited by examiner

ACOUSTIC OUTPUT DEVICE

CROSS-REFERENCE TO RELATED APPLICATIONS

This application is a continuation of International Patent Application No. PCT/CN2019/130944, filed on Dec. 31, 2019, which claims priority of Chinese Patent Application No. 201910364346.2 filed on Apr. 30, 2019, Chinese Patent Application No. 201910888762.2 filed on Sep. 19, 2019, and Chinese Patent Application No. 201910888067.6 filed on Sep. 19, 2019, the entire contents of each of which are incorporated herein by reference.

TECHNICAL FIELD

The present disclosure relates to the acoustic field, and in particular, to an acoustic output device.

BACKGROUND

An open ear acoustic output device is a portable audio output device that facilitates sound conduction within a certain range. Compared with a conventional in-ear and/or on-ear headphone, the open ear acoustic output device may has a plurality of characteristics such as not blocking and/or covering an ear canal of a user, allowing the user to obtain situational information while listening to music, and improving safety and comfort. On some occasions, a sound leakage of the open ear acoustic output device with an open structure may be more serious than that of the conventional headphone. Two or more sound sources may be used to construct a specific sound field and/or adjust a sound pressure distribution to reduce the sound leakage in a conventional industry. The manner may reduce the sound leakage to a certain extent, which may also have some limitations. For example, a volume of the sound sent to the user may be decreased during the sound leakage. In addition, the wavelengths of different frequency sounds are different, the manner may not have a good performance on reducing sound leakage of a sound with high frequency.

Therefore, it is desirable to provide an acoustic output device for increasing the volume of the sound sent to the user and reducing the sound leakage.

SUMMARY

According to an aspect of the present disclosure, an acoustic device is provided. The acoustic device may include at least one acoustic driver and a supporting structure. The at least one acoustic driver may be configured to generate a sound and output the sound through at least two sound guiding holes. The supporting structure may be configured to support the at least one acoustic driver and dispose the at least two sound guiding holes on two sides of an auricle of a user, respectively.

In some embodiments, the at least one acoustic driver may include a vibration diaphragm. A front chamber configured to radiate the sound may be disposed on the supporting structure in front of the vibration diaphragm. A rear chamber configured to radiate the sound may be disposed on the supporting structure behind the vibration diaphragm. The front chamber may be acoustically coupled with a first sound guiding hole of the at least two sound guiding holes. The rear chamber may be acoustically coupled with a second sound guiding hole of the at least two sound guiding holes.

In some embodiments, the at least two sound guiding holes may output the sound with a phase difference.

In some embodiments, the at least two sound guiding holes may output the sound with an opposite phase.

In some embodiments, a distance d between the at least two sound guiding holes may be between 1 cm and 12 cm.

In some embodiments, the at least two sound guiding holes may include two sound guiding holes. The two sound guiding holes may be disposed on a front side and a rear side of the auricle of the user, respectively. An acoustic route between a first sound guiding hole of the two sound guiding holes, which is disposed on the front side of the auricle of the user and an ear of the user may be shorter than an acoustic route between a second sound guiding hole which is disposed on the rear side of the auricle of the user and the ear of the user.

In some embodiments, the at least two sound guiding holes may include two sound guiding holes. The two sound guiding holes may be disposed on a front side and a rear side of an auricle of the user, respectively. A ratio of a distance between a sound guiding hole disposed on the front side of the auricle of the user and the auricle and a distance between the at least two sound guiding holes may be not greater than 0.5.

In some embodiments, the at least one acoustic driver may include a vibration diaphragm. Acoustic routes between the vibration diaphragm and the at least two sound guiding holes may be different.

In some embodiments, a ratio of the acoustic routes between the vibration diaphragm and the at least two sound guiding holes may be 0.5-2.

In some embodiments, sounds generated by the at least one acoustic driver at the at least two sound guiding holes may have different sound pressure amplitudes.

In some embodiments, structures between the at least two sound guiding holes and the at least one acoustic driver may have different acoustic impedance.

In some embodiments, the acoustic output device may include at least one second acoustic driver. The at least one second acoustic driver may be configured to output sound through at least two second sound guiding holes, and the at least two second sound guiding holes may be disposed on a same side of the auricle of the user.

In some embodiments, the at least two second sound guiding holes may be disposed on a front side of the auricle of the user.

In some embodiments, the acoustic output device may include a controller. The controller may be configured to cause the at least one acoustic driver to output a sound within a first frequency range, and cause the at least one second acoustic driver to output a sound within a second frequency range. A frequency within the second frequency range may be higher than that within the first frequency range.

In some embodiments, a distance between the at least two second sound guiding holes may be less than a distance between the at least two sound guiding holes.

In some embodiments, the at least two second sound guiding holes may output sounds with a phase difference.

In some embodiments, the at least two second sound guiding holes may output sounds with an opposite phase difference.

In some embodiments, at least one of the at least two sound guiding holes or the at least two second sound guiding holes are disposed on the supporting structure.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
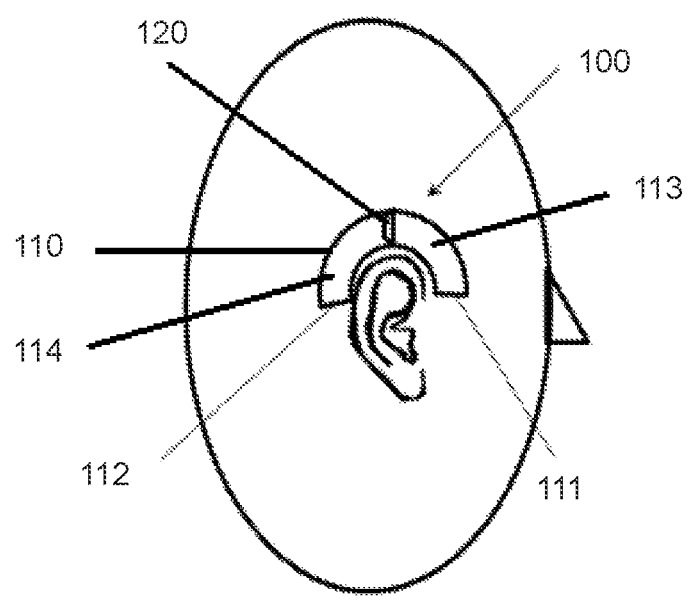
FIG. 1 is a schematic diagram illustrating an exemplary acoustic output device according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, section or assembly of different levels in ascending order. However, the terms may be displaced by another expression if they achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

According to some embodiments of the present disclosure, flow charts are used to illustrate the operations performed by the system. It should be noted that the foregoing or the following operations may not be performed in the order accurately. Instead, the steps may be processed in reverse order or simultaneously. Moreover, other operations may also be added into these operations, or one or more steps may be removed from these operations.

The present disclosure provides an acoustic output device including at least one set of acoustic drivers. When a user wears the acoustic output device, the acoustic output device may be at least placed on one side of the user's head, which may be close to and not block the user's ear. The acoustic output device may be worn on the head of the user (e.g., an open earphone which is not placed in ear and may be worn as a glasses, a headband, etc.), or worn on other body parts of the user (e.g., the neck, the shoulder of the user), or placed near the ear of a user via other manners (e.g., via a hand-hold manner. A sound generated by the at least one set of the acoustic drivers in the acoustic output device may be transmitted outward through two sound guiding holes which may be acoustically coupled with the at least one set of the acoustic drivers. In some embodiments, the two sound guiding holes may be distributed on two sides of the user's auricle. In this case, the auricle may be served as a baffle, and the at least two sound guiding holes may be separated, thereby generating different acoustic routes between the at least two sound guiding holes and the user's ear canal. In some embodiments, a baffle structure may be disposed on the acoustic output device and the at least two sound guiding holes may be distributed on two sides of the baffle structure, respectively. In some embodiments, the at least two sound guiding holes may be distributed two sides of the auricle or the baffle structure, thereby increasing an acoustic path difference between two distances that the sounds are transmitted from the two sound guiding holes to the user's ear (i.e., a distance difference between the two distances that the sounds are transmitted from the two sound guiding holes to the user's ear canal), weaken sound cancellation, increasing a volume of the sound heard by the user's ear (also referred to as a sound in the near-field), and improve a listening experience of the user. In some embodiments, auricle and/or the baffle may not affect the transmission of the sound from the at least two sound guiding holes to the surroundings (also referred to as a sound in the far-field). The sound in the far-fields transmitted from the at least two guiding holes may be offset, thereby reducing the leakage of the acoustic output device and preventing the sound being heard by others near the user.

FIG. 1 is a schematic diagram illustrating an exemplary acoustic output device 100 according to some embodiments of the present disclosure. As shown in FIG. 1, the acoustic output device 100 may include a supporting structure 110 and an acoustic driver 120, which may be disposed in the supporting structure 110. In some embodiments, the acoustic output device 100 may be worn on a user's body (e.g., the head, the neck, the upper torso, etc. of the user) through the supporting structure 110. The supporting structure 110 and the acoustic driver 120 may be close to and not block an ear canal of the user. The ear of the user may be in an open state. The user may hear a sound output from the acoustic output device 100 and a sound from an external source. For example, the acoustic output device 100 may be arranged around or partially around the user's ear, and may transmit the sound via an air conduction manner or a bone conduction manner.

The supporting structure 110 may be worn on the user's body and configured to support one or more acoustic drivers 120. In some embodiments, the supporting structure 110 may include an enclosed shell structure with an internal hollow, and the one or more acoustic drivers 120 may be disposed in the supporting structure 110. In some embodiments, the acoustic output device 100 may be combined with a product such as a pair of glasses, a headset, a display device, an AR/VR helmet, etc. In this case, the supporting structure 110 may be fixed near the user's ear via a hanging manner or a clamping manner. In some embodiments, the supporting structure 110 may include a hook, a shape of the hook may be matched the shape of the auricle, and the acoustic output device 100 may be worn on the user's ear through the hook, independently. The acoustic output device 100, which is worn on the user's ear independently may be communicated with a signal source (e.g., a computer, a mobile phone, or other mobile devices) in a wired or wireless manner (e.g., Bluetooth). For example, the acoustic output device 100 worn on the left ear and/or that worn on the right ear may be directly communicated with the signal source via a wireless manner. As another example, the acoustic output device 100 worn at the left and/or right ear may include a first output part and a second output part. The first output part may be communicated with the signal source, and the second output part may be connected to the first output part via a wireless manner. The sound may be output synchronously by the first output part and the second output part controlled by one or more synchronization signals. The wireless manner may include but not limited to the Bluetooth, a local area network, a wide area network, a wireless personal area network, a near-field communication, or the like, or any combination thereof.

In some embodiments, the supporting structure 110 may include a shell structure, and a shape of the supporting structure 110 may be matched a shape of the ear of the user. The shape of the supporting structure 110 may include a circular ring, an oval, a (regular or irregular) polygonal, a U-shape, a V-shape, a semi-circle, etc., and the supporting structure 110 may be directly anchored at the user's ear. In some embodiments, the supporting structure 110 may also include one or more fixed parts. The fixed part may include an ear hook, a head beam, an elastic band, or the like, or any combination thereof, which may be used to fix the acoustic output device 100 on the user and prevent the acoustic output device 100 from falling down. Merely by way of example, the elastic band may include a headband which may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 100 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc.), and the rigid portion may be fixed to the supporting structure 110 of the acoustic output device 100 via a physical connection (e.g., a snap connection, a screw connection, etc.). The flexible portion may be made of an elastic material (e.g., a cloth, a composite material, a neoprene, etc.).

In some embodiments, when the user wears the acoustic output device 100, the supporting structure 110 may be placed above or below the auricle. The supporting structure 110 may also include a sound guiding hole 111 and a sound guiding hole 112, which may be configured to transmit sounds. In some embodiments, the sound guiding hole 111 and the sound guiding hole 112 may be placed on two sides of the user's auricle, respectively. The acoustic driver 120 may output sound(s) through the sound guiding hole 111 and/or the sound guiding hole 112.

The acoustic driver 120 may be configured to receive an electrical signal, and convert the electrical signal into a sound signal which may be output. In some embodiments, a type of the acoustic driver 120 may include an acoustic driver with a low-frequency (e.g., 30 Hz-150 Hz), an acoustic driver with a middle-low-frequency (e.g.,150 Hz-500 Hz), an acoustic driver with a middle-high-frequency (e.g., 500 Hz-5 kHz) acoustic driver, an acoustic driver with a high-frequency e.g., 5 kHz-16 kHz), an acoustic driver with a full-frequency (e.g., 30 Hz-16 kHz), or the like, or any combination thereof, according to the frequency of the acoustic driver 120. The low-frequency, the middle-low-frequency, the middle-high-frequency, the high-frequency, and/or the full-frequency may be merely used to indicate an approximate range of the frequency. In different application scenarios, different modes may be used to divide the frequency. For example, a frequency division point may be determined, the low frequency may indicate a frequency range which is less than the frequency division point, and the high frequency may indicate the frequency range which is greater than the frequency division point. The frequency division point may be any value within an audible range that can be heard by the ear of the user, for example, 500 Hz, 600 Hz, 700 Hz, 800 Hz, 1000 Hz, etc. In some embodiments, the acoustic driver 120 may include a moving coil acoustic driver, a moving iron acoustic driver, a piezoelectric acoustic driver, an electrostatic acoustic driver, a magnetostrictive acoustic driver according to a principle of the acoustic driver 120.

In some embodiments, the acoustic driver 120 may include a vibration diaphragm. When the vibration diaphragm vibrates, sounds may be transmitted from a front side and a rear side of the vibration diaphragm, respectively. In some embodiments, a front chamber 113 may be disposed on the front side of the vibration diaphragm in the supporting structure 110, which may be configured to transmit the sound(s). The front chamber 113 may be acoustically coupled with the sound guiding hole 111. The sound transmitted from the front side of the vibration diaphragm may be transmitted from the sound guiding hole 111 through the front chamber 113. A rear chamber 114 may be disposed on the rear side of the vibration diaphragm in the supporting structure 110, which may be configured to transmit the sound(s). The rear chamber 114 may be acoustically coupled with the sound guiding hole 112. The sound transmitted from the rear side of the vibration diaphragm may be transmitted from the sound guiding hole 112 through the rear chamber 114. It should be noted that, when the vibration diaphragm vibrates, the front side and the rear side of the vibration diaphragm may simultaneously generate sounds with opposite phases. After passing through the front chamber 113 and rear chamber 114, respectively, the sounds may be transmitted outward from the sound guiding hole 111 and the sound guiding hole 112. In some embodiments, the sounds output by the acoustic driver 120, which may be transmitted through the sound guiding hole 111 and the sound guiding hole 112 may meet specific requirement by setting a structure of at least one of the front chamber 113 and the rear chamber 114. For example, the sound guiding hole 111 and the sound guiding hole 112 may transmit a set of sounds with a specific phase relationship (e.g., opposite phases) by designing a length of at least one of the front chamber 113 and the rear chamber 114, thereby increasing a volume in the near-field of the acoustic output device 100, avoiding sound leakage of the acoustic output device 100, and effectively improving the performance of the acoustic output device 100.

In some alternative embodiments, the acoustic driver 120 may include a plurality of vibration diaphragms (e.g., two vibration diaphragms). The plurality of vibration diaphragms may vibrate to generate sounds, respectively. Each of the sounds may be transmitted pass through a chamber which is connected to one of the vibration diaphragms in the supporting structure and may be output from a corresponding sound guiding hole. The plurality of vibration diaphragms may be controlled by a same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

In some embodiments, the acoustic output device 100 may include a plurality of acoustic drivers 120. The plurality of acoustic drivers 120 may be controlled by a same controller or different controllers. The plurality of acoustic drivers 120 may generate sounds that satisfy the requirement of certain phase(s) and/or amplitude(s). Merely by way of example, the plurality of acoustic output devices 120 may include a first acoustic driver and a second acoustic driver. The controller may control the first acoustic driver and the second acoustic driver using a control signal to generate sounds with certain phase(s) and amplitude(s) (e.g., the sounds with the same amplitude and opposite phases, the sounds with different amplitudes and opposite phases, etc.). The first acoustic driver may output a sound of the sounds through at least one of the first sound guide holes, and the second acoustic driver may output a sound of the sounds through at least one of the second sound guide holes. The first sound guide hole and the second sound guide hole may be disposed on two sides of the auricle, respectively. It should be noted that a count of the plurality of acoustic drivers may not be limited to two, for example, three, four, five, etc. Sound parameters (e.g., a phase, a frequency, an amplitude, etc.) of each of the plurality of acoustic drivers may be adjusted according to actual needs.

Figure 2:
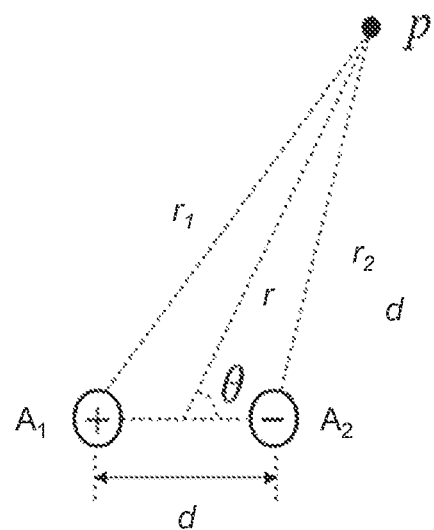
FIG. 2 is a schematic diagram illustrating an interaction between two-point sound sources according to some embodiments of the present disclosure.

FIG. 2 is a schematic diagram illustrating an interaction between two-point sound sources according to some embodiments of the present disclosure. In order to further explain influence of the sound guide holes distribution on two sides of the auricle on the sound output of the acoustic output device 100, the acoustic output device 100 and the auricle may be taken as a two-point sound source-baffle model according to some embodiments of the present disclosure.

Merely for illustration purpose, when the size of each of the sound guiding holes on the acoustic output device 100 is relatively small, each of the sound guiding holes may be regarded as a point sound source. A sound field pressure p generated by a single-point sound source may be represented by Equation (1) below:

$$p = \frac{j\omega\rho_0}{4\pi r} Q_0 \exp j\,(\omega t - kr), \quad (1)$$

where w represents an angular frequency, $\rho_0$ represents an air density, r represents a distance between a target point and the single-point sound source, $Q_0$ represents a volume velocity of the single-point sound source, and k represents a wave number. It may be concluded that a magnitude of the sound field pressure of a sound field of the point sound source is inversely proportional to the distance from the target point to the point sound source.

As mentioned above, at least two sound guiding holes (e.g., the sound guiding holes 111 and the sound guiding holes 112) may be disposed on the acoustic output device 100 to form two-point sound sources, thereby reducing sound transmitted to the surroundings. In some embodiments, sounds output from two sound guiding holes, i.e., a two-point sound sources, may have a certain phase difference. When positions of the two-point sound sources and/or the phase difference of the two-point sound sources meet a certain condition, the acoustic output device 100 may perform different sound effects in the near-field and the far-field. For example, when phases of the point sound sources corresponding to the two sound guiding holes, respectively, are opposite, that is, an absolute value of the phase difference between the two-point sound sources is 180 degrees, and the sound leakage in the far-field may be reduced according to a principle of reversed-phase cancellation.

As shown in FIG. 2, a sound field pressure p generated by a two-point sound sources may be represented by Equation (2) below:

$$p = \frac{A_1}{r_1}\exp j(\omega t - kr_1 + \varphi_1) + \frac{A_2}{r_2}\exp j(\omega t - kr_2 + \varphi_2), \quad (2)$$

where $A_1$ and $A_2$ represent the intensity of each of the two-point sound sources, $\varphi_1$ and $\varphi_2$ represent phases of the two-point sound sources, respectively, and d represents a distance between the two-point sound sources. $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad 3)$$

where r represents a distance between the target point and a center of the two-point sound sources, and θ represents an angle formed by a line connecting the target point and the center of the two-point sound sources and a line on which the two-point sound sources are located.

It may be known from Equation (3) that a value of the sound pressure p of the target point in the sound field may be related to the intensity of each of the point sound sources, the distance d, the phase, and the distance from the target point and the sound source.

Figure 3:
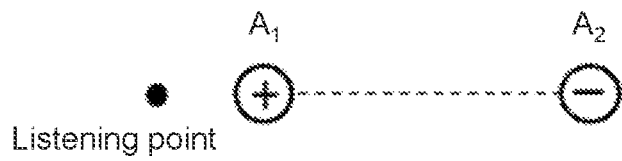
FIG. 3 is a schematic diagram illustrating point sound sources and a listening position according to some embodiments of the present disclosure.
Figure 4:
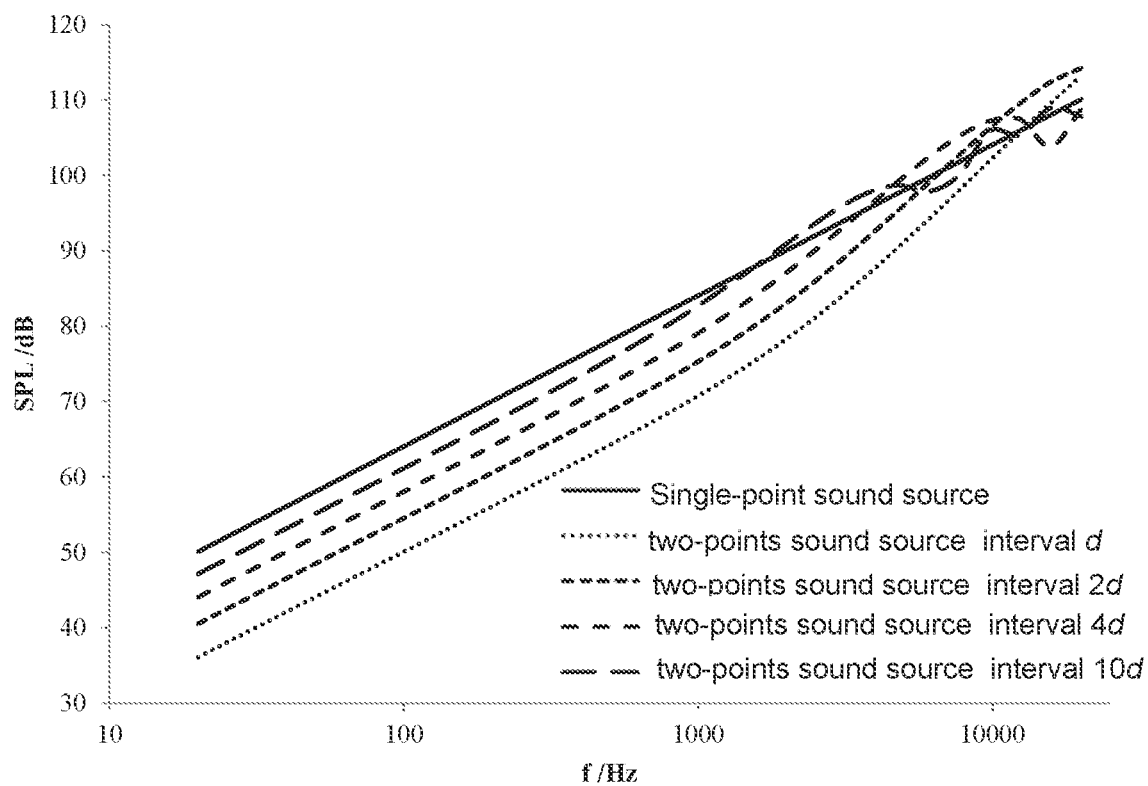
FIG. 4 is a schematic diagram illustrating frequency response characteristic curves of two two-point sound sources with different distances in a listening position in a near-field according to some embodiments of the present disclosure.

FIG. 3 is a schematic diagram illustrating an exemplary two-point sound sources and a listening position according to some embodiments of the present disclosure. FIG. 4 is a schematic diagram illustrating frequency response characteristic curves of two two-point sound sources with different distances in a listening position in a near-field according to some embodiments of the present disclosure. In some embodiments, the listening position may be regarded as a target point to further explain a relationship between an acoustic pressure at the target point and the distance d between the point sound sources. The listening position may be used to indicate a position of an ear of a user, that is, a sound at the listening position may be used to indicate a sound in a sound in the near-field generated by the two-point sound sources. It should be noted that "a sound in the near-field" may refer to a sound within a certain distance from a sound source (e.g., the sound guide hole 111 which may be regarded as a point sound source), for example, a sound within 0.2 m from the sound source. Merely by way of example, as shown in FIG. 3, the point sound source $A_1$ and the point sound source $A_2$ may be on a same side of the listening position. The point sound source $A_1$ may be closer to the listening position, and the point sound source $A_1$ and the point sound source $A_2$ may output sounds with a same amplitude and opposite phases. As shown in FIG. 4, as the distance between the point sound source $A_1$ and the point sound source $A_2$ gradually increases (e.g., from d to 10 d), a sound volume at the listening position may be gradually increased. As the distance between the point sound source $A_1$ and the point sound source $A_2$ increases, a difference between sound pressure amplitudes (i.e., sound pressure difference) between the two sounds reaching the listening position may be increased, and a difference of acoustic routes may be increased, thereby reducing the sound cancellation and increasing the sound volume of the listening position. Due to the existence of the sound cancellation, the sound volume at the listening position may be less than that generated by a single-point sound source with a same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume of the listening position generated by the two-point sound sources may be greater than that generated by the single-point sound source. As used herein, the sound pressure amplitude (i.e., a sound pressure) may refer to a pressure generated by the sound through the vibration of the air.

Figure 5:
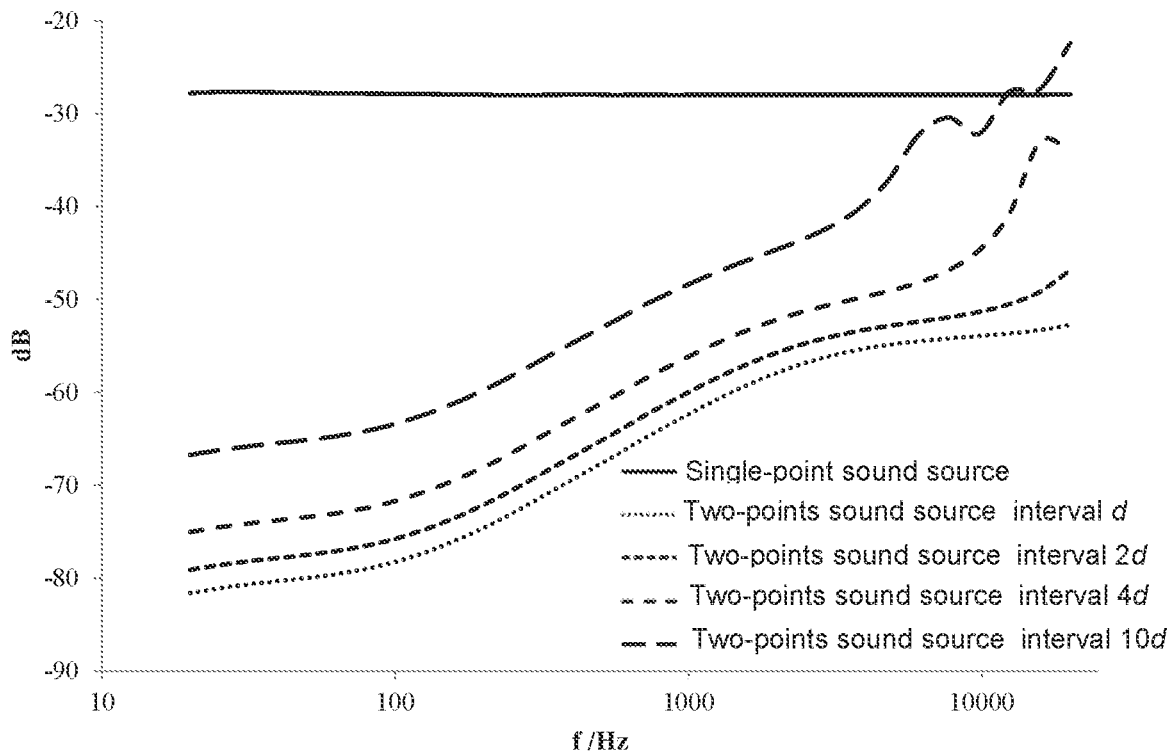
FIG. 5 is a schematic diagram illustrating exemplary sound leakage parameters of two-point sound sources with different distances in a far-field according to some embodiments of the present disclosure.

In some embodiments, the sound volume at the listening position may be increased by increasing the distance between the two-point sound sources (e.g., the point sound source $A_1$ and the point sound source $A_2$). As the distance increases, the sound cancellation of the two-point sound sources may be weakened, thereby increasing sound leakage in the far-field. For illustration purposes, FIG. 5 is a schematic diagram illustrating exemplary sound leakage parameters of two-point sound sources with different distances in the far-field according to some embodiments of the present disclosure. As shown in FIG. 5, taking a sound leakage parameter of a single-point sound source in the far-field as a reference, as the distance between the two-point sound sources increases from d to 10 d, the sound leakage parameter in the far-field may be gradually increased, which may indicate that the sound leakage may be gradually increased. More descriptions regarding the sound leakage parameter may refer to Equation (4) and related descriptions.

Figure 6:
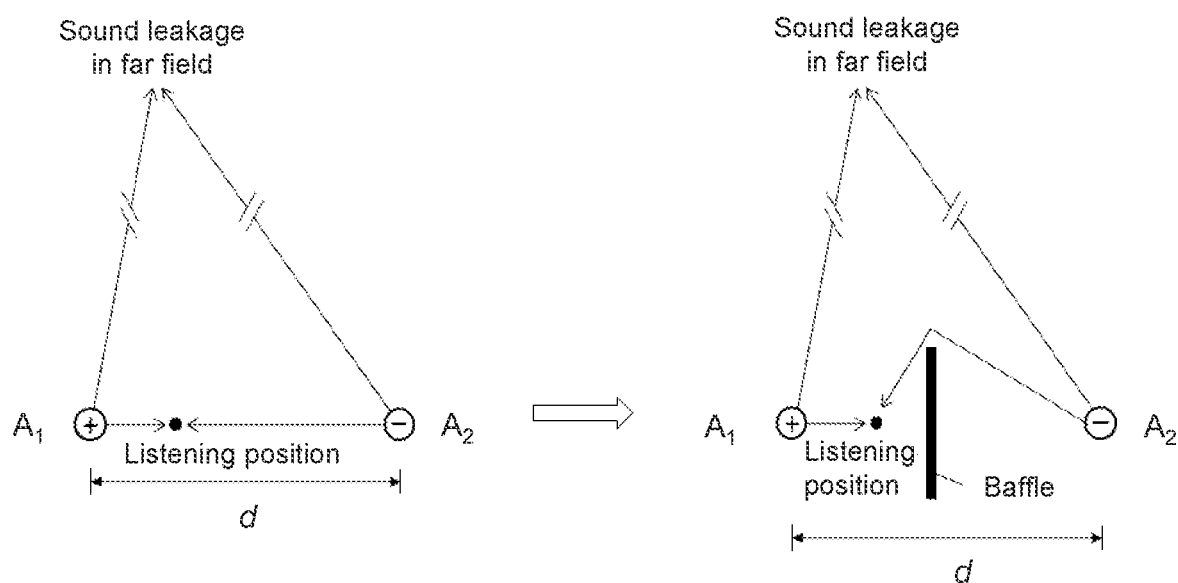
FIG. 6 is a schematic diagram illustrating an exemplary baffle disposed between the two-points sound sources according to some embodiments of the present disclosure.

In some embodiments, two sound guide holes may be disposed on two sides of the auricle of the user, which may improve an output effect of the acoustic output device 100, that is, increase the sound intensity of the listening position in the near-field and reduce the sound leakage in the far-field. For illustration purposes, the auricle of the user is regarded as a baffle, and the sounds transmitted from the two sound guide holes are regarded as two-point sound sources. FIG. 6 is a schematic diagram illustrating an exemplary baffle disposed between the two-points sound sources according to some embodiments of the present disclosure. As shown in FIG. 6, when the baffle is disposed between a point sound source $A_1$ and a point sound source $A_2$, a sound field of the point sound source $A_2$ may bypass the baffle to interfere with a sound wave of the point sound source $A_1$ at a listening position in the near-field, which may increase an acoustic route between the point sound source $A_2$ and the listening position. Assuming that the point sound source $A_1$ and the point sound source $A_2$ have a same amplitude, an amplitude difference between the sound waves of the point sound source $A_1$ and the point sound source $A_2$ at the listening position may be greater than that in a case without a baffle, thereby reducing a sound cancellation of the two sounds at the listening position, increasing a sound volume at the listening position. In the far-field, the sound waves generated by the point sound source $A_1$ and the point sound source $A_2$ may not bypass the baffle in a relatively large space, the sound waves may be interfered (as a case without the baffle). Compared to the case without the baffle, the sound leakage in the far-field may be not increased significantly. Therefore, the baffle being disposed between the point sound source $A_1$ and the point sound source $A_2$ may significantly increase the sound volume at the listening position in the near-field and not significantly increase the sound leakage in the far-field.

Figure 7:
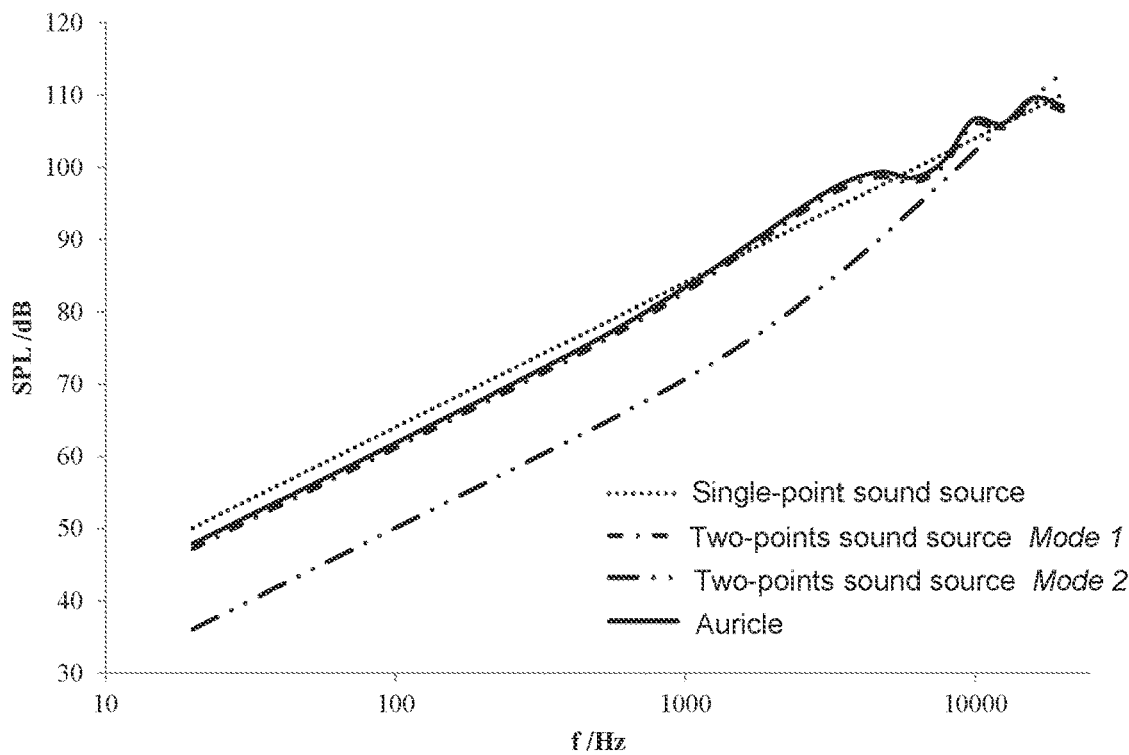
FIG. 7 is a schematic diagram illustrating exemplary frequency response characteristic curves of a near-field when the auricle is located between two-point sound sources according to some embodiments of the present disclosure.
Figure 8:
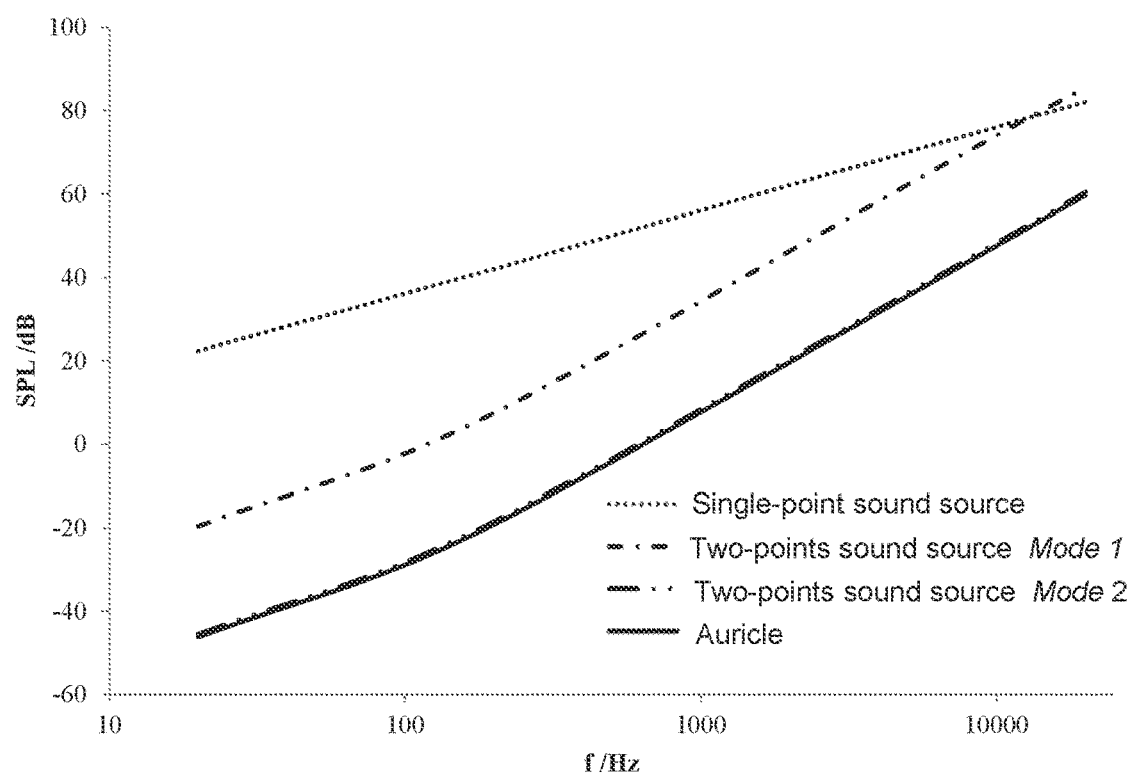
FIG. 8 is a schematic diagram illustrating exemplary frequency response characteristic curves of a far-field when an auricle is located between two-point sound sources according to some embodiments of the present disclosure.

FIG. 7 is a schematic diagram illustrating exemplary frequency response characteristic curves of a near-field when the auricle is located between two-point sound sources according to some embodiments of the present disclosure. FIG. 8 is a schematic diagram illustrating an exemplary frequency response characteristic curve of a far-field when the auricle is located between two-point sound sources according to some embodiments of the present disclosure. According to some embodiments of the present disclosure, when the two-point sound sources are located on two sides of the auricle, the auricle may perform a function of a baffle, and the auricle may be referred to as a baffle for convenience. Merely by way of example, due to the existence of the auricle, a sound in the near-field may be generated by two-point sound sources with a distance D1 (also referred to as Mode 1). A sound in a sound in the far-field may be generated by two-point sound sources with a distance D2 (also referred to as Mode 2), and D1>D2. As shown in FIG. 7, for a low-frequency (e.g., a frequency less than 1000 Hz), a volume of the sound in the near-field (i.e., a sound heard by an ear of a user) may be the same as or similar to that in mode 1 when the two-point sound sources are located on two sides of the auricle, which may be greater than a volume of a sound in the near-field in mode 2 and may be close to a volume of a sound in a near-field of a single-point sound source. As the frequency increases (e.g., 2000 Hz~7000 Hz), the volume of the sound in the near-field in mode 1 and that generated by the two-point sound sources located on two sides of the auricle may be greater than that of the one-point sound source. It should be understood that, when the auricle is located between the two-point sound sources, the volume of the sound in the near-field transmitted from a sound source to the ear may be effectively increased. As shown in FIG. 8, as the frequency increases, the sound leakage in the far-field may be increased. When the two-point sound sources is located on two sides of the auricle, the sound leakage in the far-field leakage generated by the two-point sound sources may be the same as (or substantially same as) the sound leakage in the far-field in Mode 2, which may be less than the sound leakage in far-field in Mode 1 and/or the sound leakage in the far-field leakage generated by a single-point sound source. Therefore, when the auricle is located between the two-point sound sources, the sound transmitted from the sound source to the far-field may be effectively reduced, that is, the sound leakage from the sound source to the surroundings may be effectively reduced.

More descriptions regarding the sound leakage parameter (s) may be found in the following descriptions. In an application of an open ear acoustic output device, an acoustic pressure Pear transmitted to the listening position may be large enough to meet the listening requirements, and an acoustic pressure $P_{far}$ radiated to the far-field may be small enough to reduce the sound leakage. A sound leakage parameter a may be taken as a parameter for evaluating a capability to reduce the sound leakage, and the sound leakage parameter a may be represented by Equation (4) below:

$$\alpha = \frac{|P_{far}|^2}{|P_{ear}|^2}, \quad (4)$$

Figure 9:
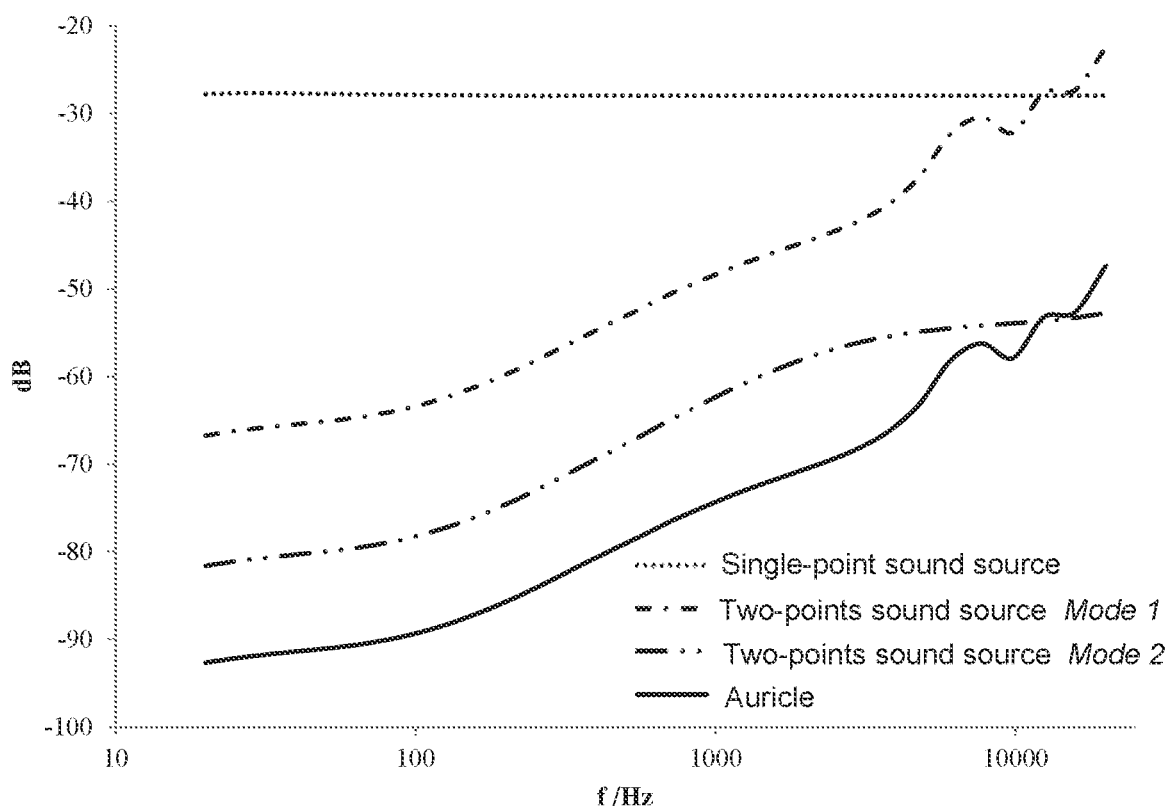
FIG. 9 is a schematic diagram illustrating sound leakage parameters when two-point sound sources are disposed on two sides of an auricle according to some embodiments of the present disclosure.

It can be known from Equation (4) that the smaller the sound leakage parameter, the stronger the leakage reduction ability of the acoustic output device. The sound leakage in the far-field may be smaller when a volume of a sound at the listening position in a near-field listening is same. As shown in FIG. 9, when the frequency is less than 10000 Hz, the sound leakage parameter when the two-point sound sources are distributed on two sides of the auricle may be less than that in the mode 1 (no baffle is disposed between the two-point sound sources and the distance is D1), the mode 2 (no baffle is disposed between the two-point sound sources, and the distance is D2), and the single-point sound source. Therefore, the performance of reducing the sound leakage of the acoustic output device 100 may be improved when the two-point sound sources are located on two sides of the auricle.

Figure 10:
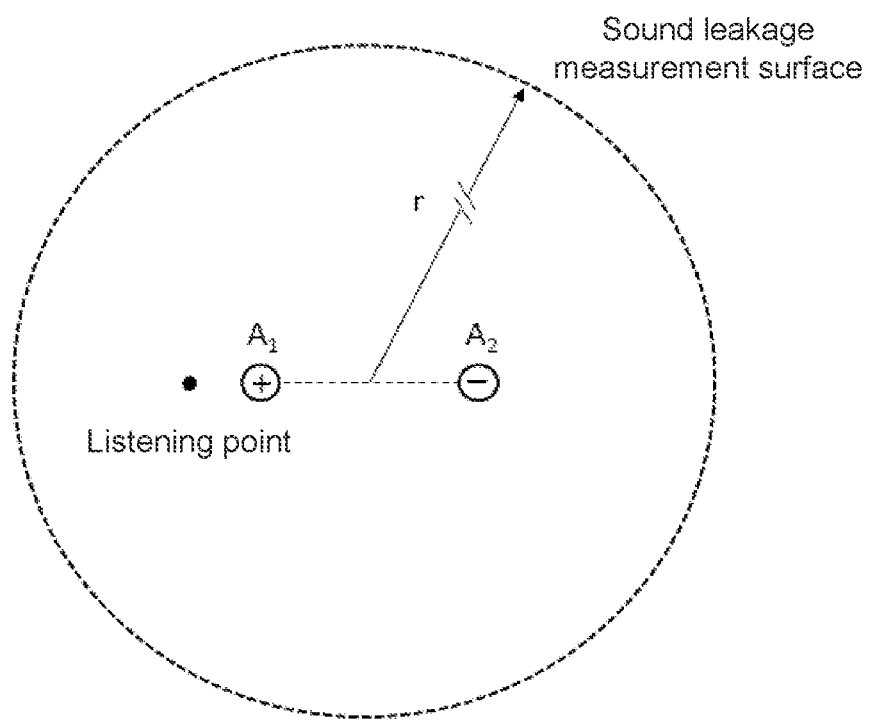
FIG. 10 is a schematic diagram illustrating a measurement of a sound leakage parameter according to some embodiments of the present disclosure.

FIG. 10 is a schematic diagram illustrating a measurement of a sound leakage parameter according to some embodiments of the present disclosure. As shown in FIG. 10, a listening position may be located at the left of the point source $A_1$. A method for measuring the sound leakage may include selecting an average value of acoustic pressure amplitudes of points located on a spherical surface with a center of two-point sound source (e.g., denoted by $A_1$ and $A_2$ as shown in FIG. 10) as a center and the radius r as a value of the sound leakage. It should be noted that the method for measuring the sound leakage in this embodiment is merely an example of the principle and effect, and not tended to limit the scope of the present disclosure. The method for measuring the sound leakage may also be adjusted according to an actual situation. For example, one or more points in a far-field may be used to measure the sound leakage. As another example, an intermediate point of the two-point sound source may be taken as a center of a circle, and two or more points are uniformly taken in the far-field according to a certain spatial angle, and the acoustic pressure amplitudes of the points may be averaged as the value of the sound leakage. In some embodiments, a method for measuring a heard sound may include selecting a position near the point sound source(s) as the listening position, and an amplitude of an acoustic pressure measured at the listening position as a value of the heard sound. In some embodiments, the listening position may be on a line connecting the two-point sound sources, or may not be on the line. The method for measuring the heard sound may be reasonably adjusted according to the actual situation. For example, acoustic pressure amplitudes of one or more other points of the near-field position may be averaged as the value of the heard sound. As another example, one of the point sound sources may be taken as a center of a circle, and two or more points may be uniformly taken in the near-field according to a certain spatial angle, the acoustic pressure amplitudes of the points may be averaged as the value of the heard sound. In some embodiments, a distance between the listening position in the near-field and the point sound source(s) may be less than a distance between the point sound source(s) and the spherical surface.

It should be noted that the sound guiding holes for outputting sound taken as point sound sources may only serve as an explanation of the principle and effect of the present disclosure, and may not limit the shapes and sizes of the sound guiding holes in practical applications. In some embodiments, when an area of a sound guiding hole is relatively large, the sound guiding hole may be regarded as a planar acoustic source. In some embodiments, the point sound source may also be realized by other structures, such as a vibration surface, a sound radiation surface, etc. For those skilled in the art, without creative activities, it may be known that the sound produced by a structure such as the sound guiding hole, the vibration surface, and the acoustic radiation surface may be equivalent to the point sound source in the spatial scale discussed in the present disclosure, which may have consistent sound propagation characteristics and a same mathematical description method. Further, for those skilled in the art, without creative activities, it may be known that an acoustic effect achieved by "the acoustic driver may output sound through at least two first sound guiding holes" described in the present disclosure may also be achieved by other acoustic structures, for example, "at least two acoustic drivers may output sound through at least one acoustic radiation surface." According to actual situations, other acoustic structures may be selected, adjusted, and/or combined, and the same acoustic output effect may also be achieved. The principle of radiating sound outward from a structure such as the surface sound source may be similar to that of the point sound source, and not repeated herein. In addition, the number or the count of the sound guide holes (e.g., the point sound source, the surface sound source, etc.) on the acoustic output device is not limited to two mentioned above, and the number or the count of the sound guide holes may be three, four, five, etc., thereby forming multiple sets of two-points/areas sound sources, or a set of multiple-points/areas sound sources, which are not limited herein, which may achieve the technical effects of the two-point sound sources according to some embodiments of the present disclosure.

In order to further explain an effect on the acoustic output of the acoustic output device 100 with or without a baffle between two-point sound sources or two sound guiding holes, a volume of a sound at the listening position in a near-field and/or a volume of sound leakage in a far-field leakage under different conditions may be described below.

Figure 11:
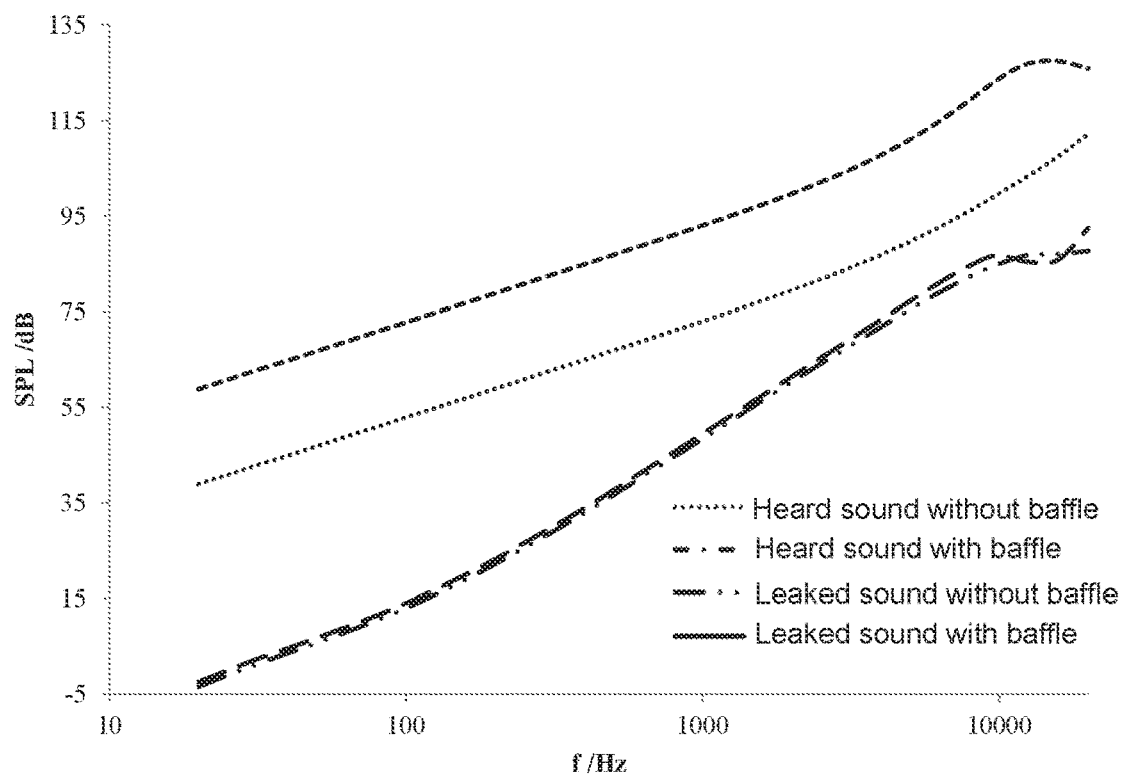
FIG. 11 is a schematic diagram illustrating exemplary frequency response characteristic curves of two-point sound sources when a baffle is disposed and not disposed between the two-point sound sources according to some embodiments of the present disclosure.

FIG. 11 is a schematic diagram illustrating exemplary frequency response characteristic curves of two-point sound sources when a baffle is disposed and not disposed between the two-point sound sources. As shown in FIG. 11, when the baffle is disposed between the two-point sound sources (i.e., two sound guiding holes) of the acoustic output device, a distance between the two-point sound sources may be increased in the near-field, and the volume of the sound at the listening position in the near-field may be equivalent to being generated by two-point sound sources with a relatively large distance, thereby increasing the volume of the sound in the near-field compared to a case without the baffle. In the far-field, the interference of sound waves generated by the two-point sound sources may be not significantly affected by the baffle, the sound leakage may be regarded as being generated by a set of two-point sound sources with a relatively small distance, and the sound leakage may be not changed significantly with or without the baffle. The baffle disposed between the two sound guiding holes (the two-point sound sources) may improve the performance of the acoustic output device of reducing the sound leakage, and increase the volume of the sound in the near-field, thereby reducing requirements for a component that plays an acoustic role in the acoustic output device, simplifying a circuit structure of the acoustic output device, reducing electrical loss of the acoustic output device, and prolonging a working time of the acoustic output device.

Figure 12:
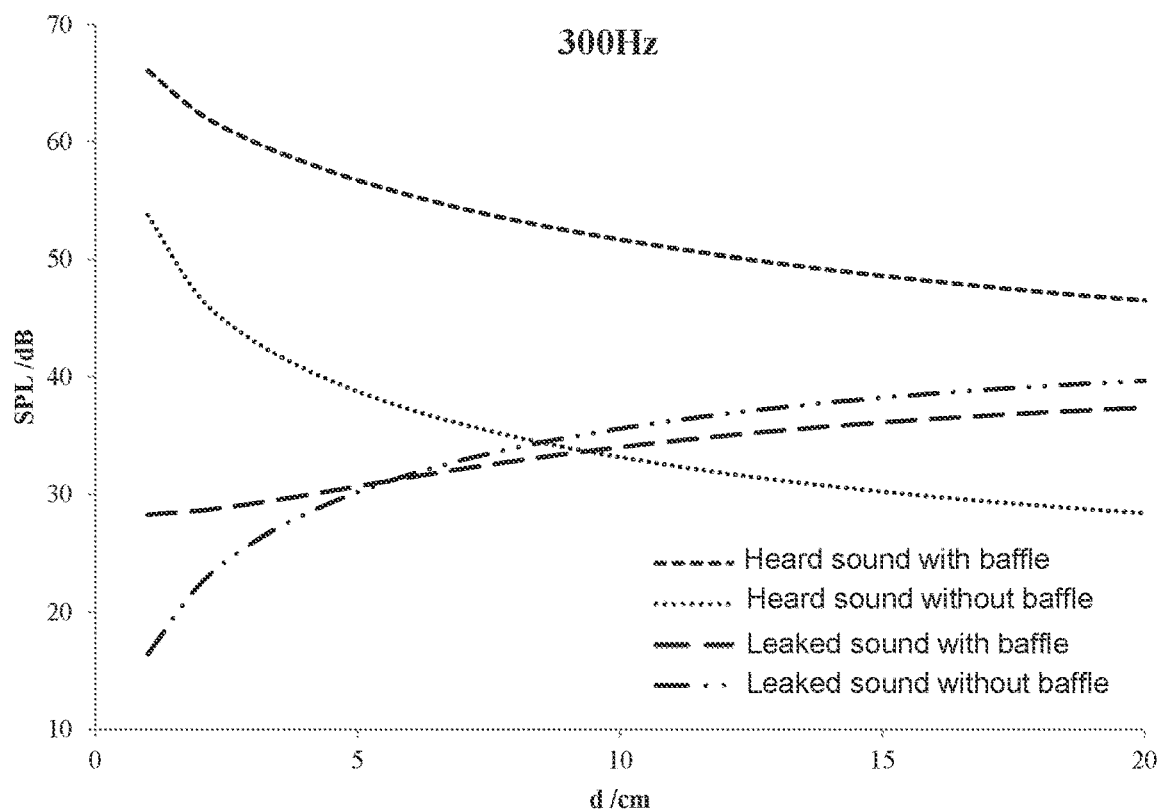
FIG. 12 is a schematic diagram illustrating exemplary curves of acoustic pressure amplitudes corresponding to two-point sound sources with different distances and a frequency of 300 Hz according to some embodiments of the present disclosure.
Figure 13:
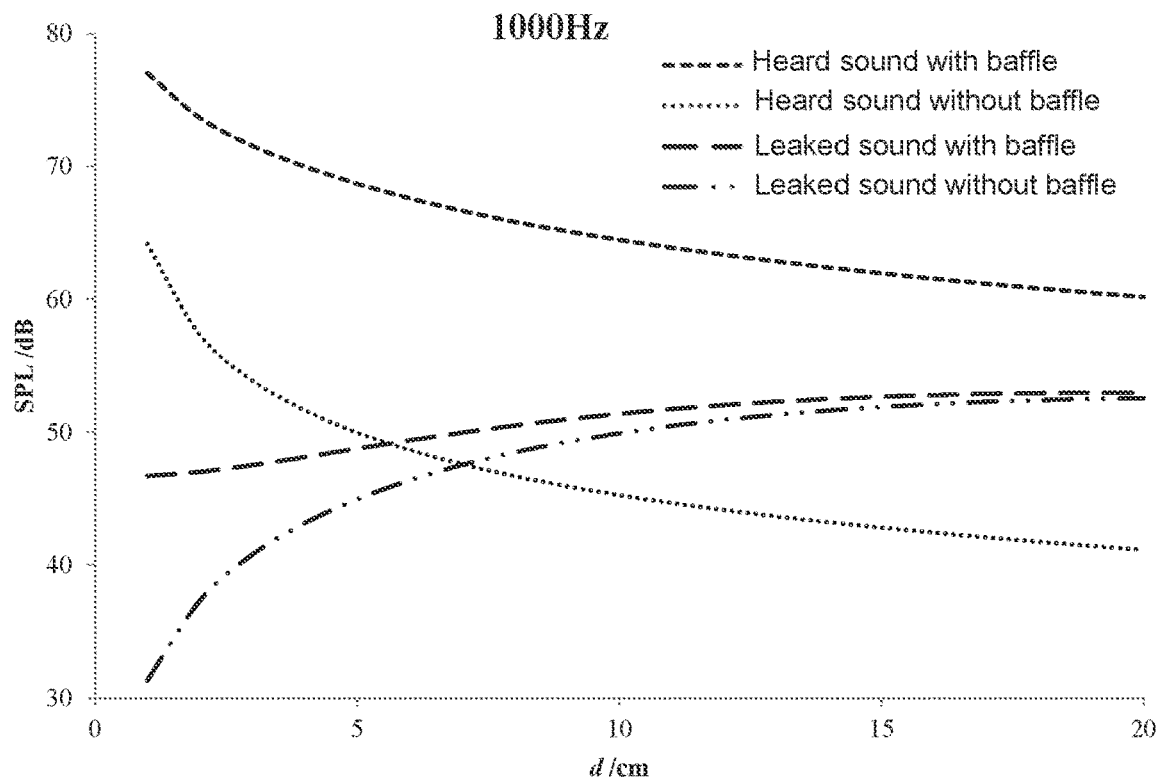
FIG. 13 is a schematic diagram illustrating exemplary curves of acoustic pressure amplitudes corresponding to two-point sound sources with different distances and a frequency of 1000 Hz according to some embodiments of the present disclosure.

FIG. 12 is a schematic diagram illustrating exemplary curves of acoustic pressure amplitudes corresponding to two-point sound sources with different distances and a frequency of 300 Hz. FIG. 13 is a schematic diagram illustrating exemplary curves of acoustic pressure amplitudes corresponding to two-point sound sources with different distances and a frequency of 1000 Hz. As shown in FIGS. 12 and 13, in the near-field, when the frequency is 300 Hz or 1000 Hz, a volume of a heard sound when a baffle is disposed between the two-point sound sources is greater than a volume of a heard sound when the baffle is not disposed between the two-point sound sources as the distance d of the two-point sound sources is increased. In this case, the baffle disposed between the two-point sound sources may effectively increase the volume of the heard sound in the near-field when the frequency is 300 Hz or 1000 Hz. In a far-field, a volume of a leaked sound when the baffle is disposed between the two-point sound sources may be equivalent to (or substantially equivalent to) a volume of the leaked sound when the baffle is not disposed between the two-point sound sources, which may show that the baffle disposed between the two-point sound sources may not affect on the sound leakage in the far-field when the frequency is 300 Hz or 1000 Hz.

Figure 14:
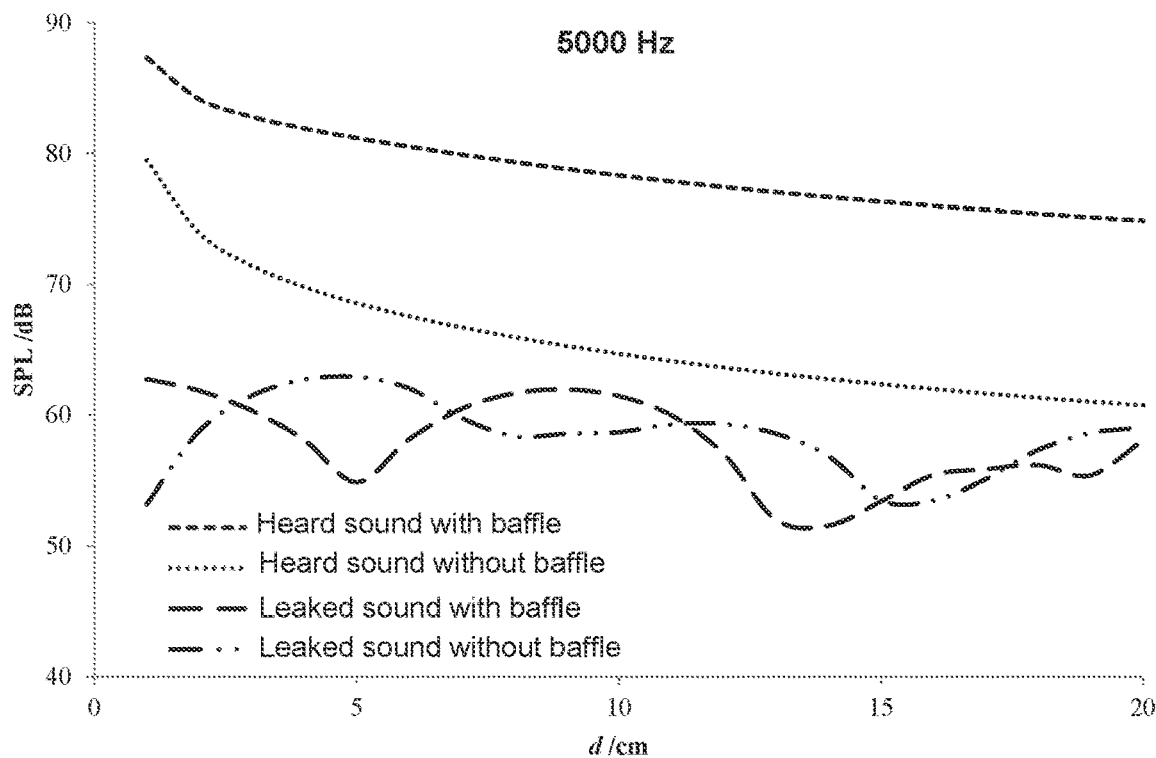
FIG. 14 is a schematic diagram illustrating exemplary curves of acoustic pressure amplitudes corresponding to two-point sound sources with different distances and a frequency of 5000 Hz according to some embodiments of the present disclosure.

FIG. 12 is a schematic diagram illustrating exemplary curves of acoustic pressure amplitudes corresponding to two-point sound sources with different distances and a frequency of 5000 Hz. As shown in FIG. 14, in the near-field, when the frequency is 5000 Hz, a volume of a heard sound when a baffle is disposed between the two-point sound sources is greater than a volume of a heard sound when the baffle is disposed between the two-point sound sources as the distance d of the two-point sound sources is increased. In the far-field, a volume of a leaked sound of the two-point sound sources may be fluctuant as a function of the distance d when the baffle is disposed and not disposed between the two-point sound sources. Overall, whether the baffle structure is disposed between the two-point sound sources may have little effect on the sound leakage in the far-field.

Figure 15:
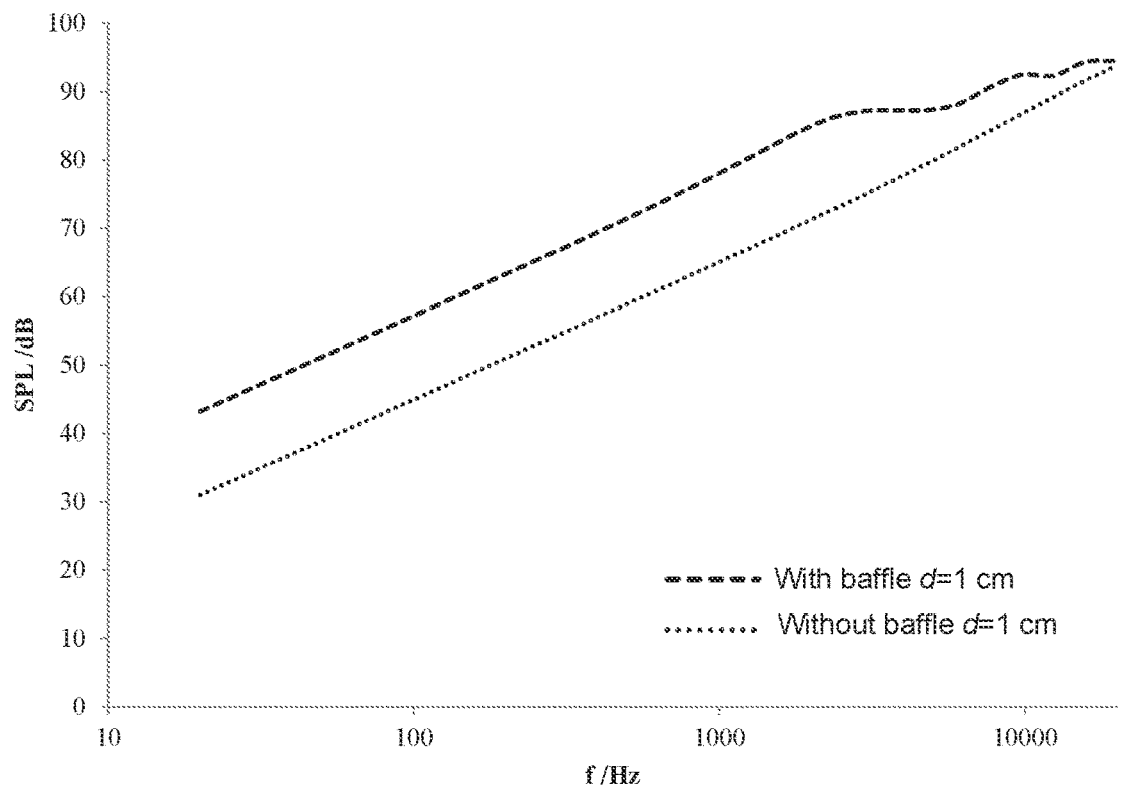
FIG. 15 is a schematic diagram illustrating exemplary frequency response characteristic curves of two-point sound sources when a distance d between the two-point sound sources is 1 cm.
Figure 16:
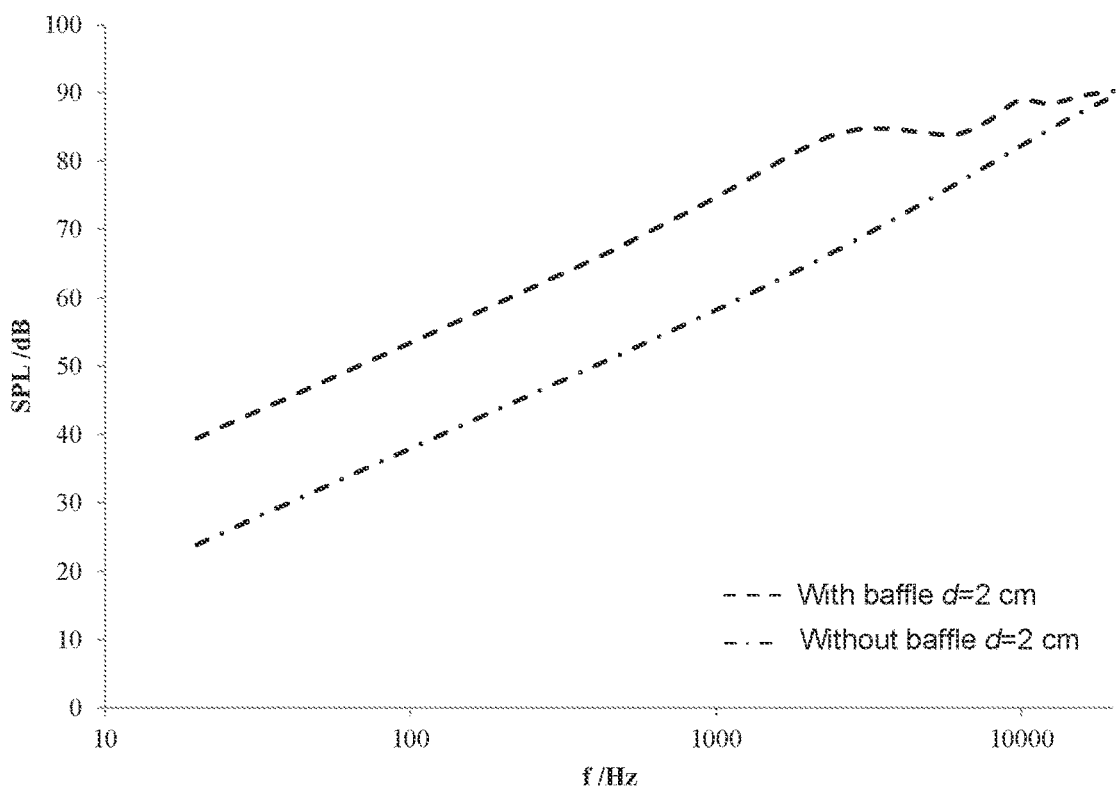
FIG. 16 is a schematic diagram illustrating exemplary frequency response characteristic curves of two-point sound sources when a distance d between the two-point sound sources is 2 cm.
Figure 17:
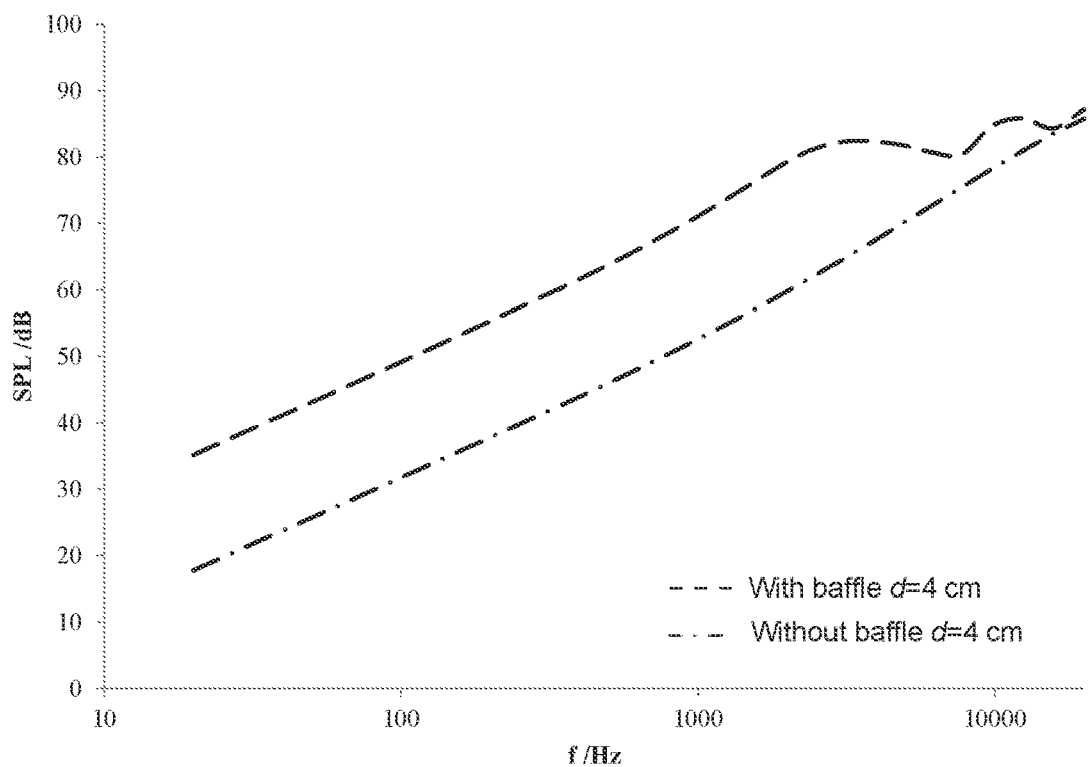
FIG. 17 is a schematic diagram illustrating exemplary frequency response characteristic curves of two-point sound sources when a distance d between the two-point sound sources is 4 cm.
Figure 18:
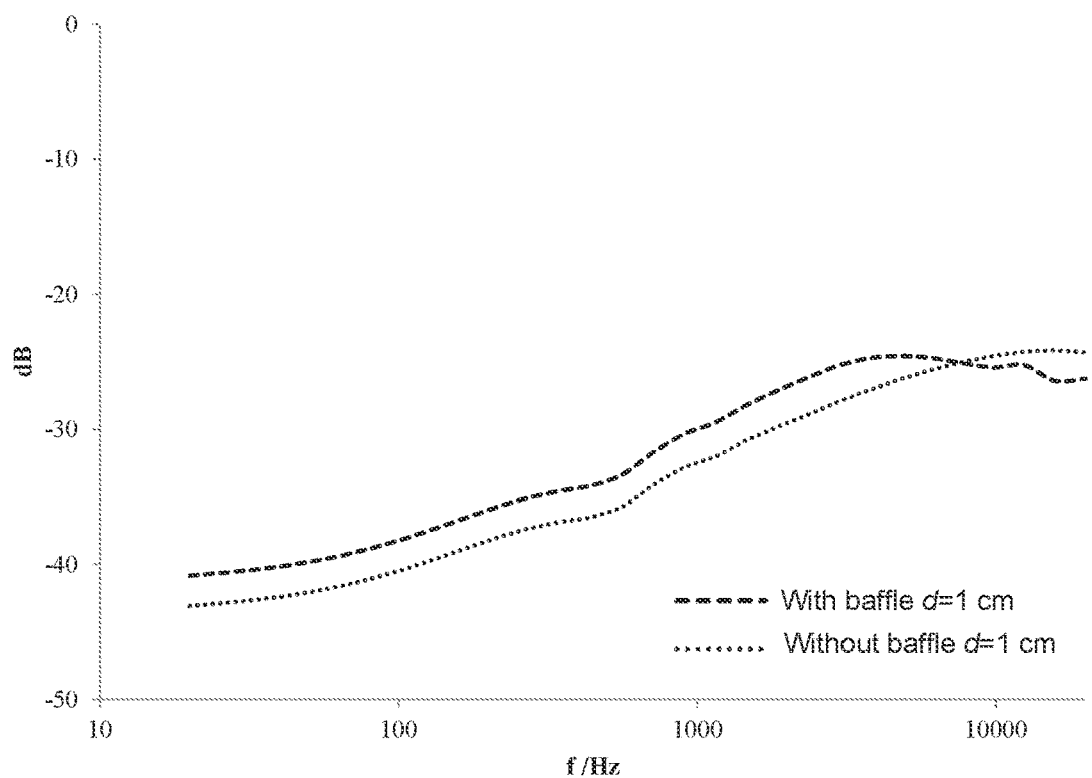
FIG. 18 is a schematic diagram illustrating a sound leakage parameter in a far-field when a distance d between the two-point sound sources is 1 cm.
Figure 19:
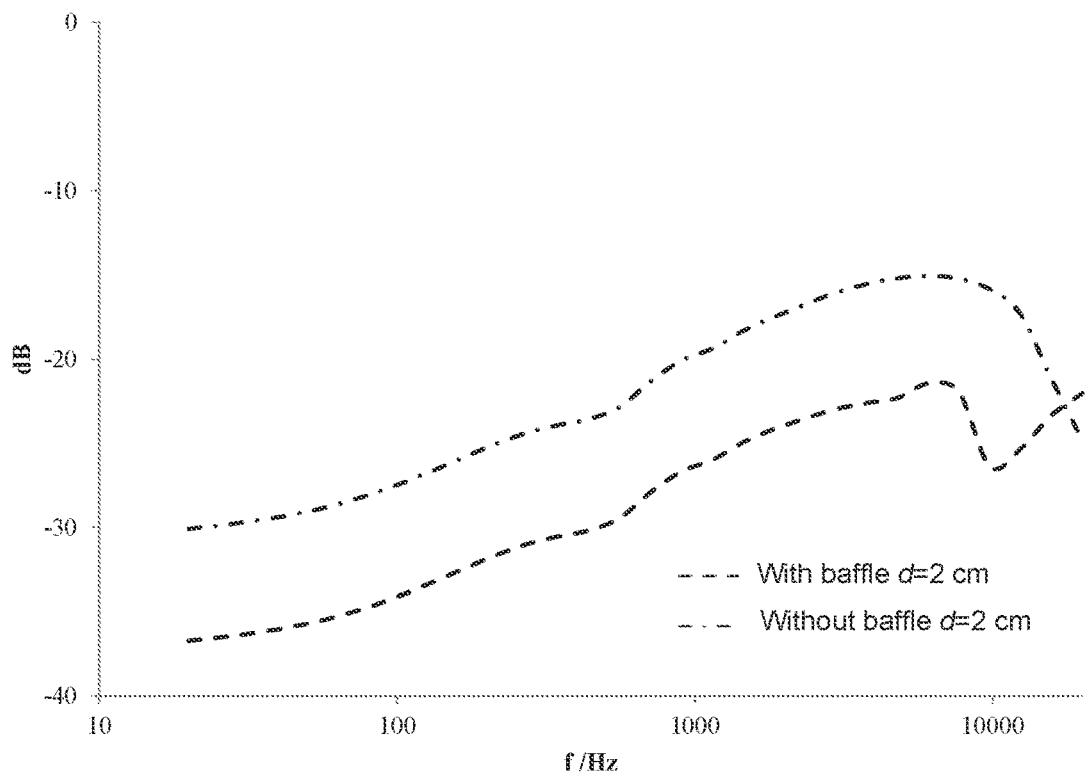
FIG. 19 is a schematic diagram illustrating a sound leakage parameter in a far-field when a distance d between the two-point sound sources is 2 cm.
Figure 20:
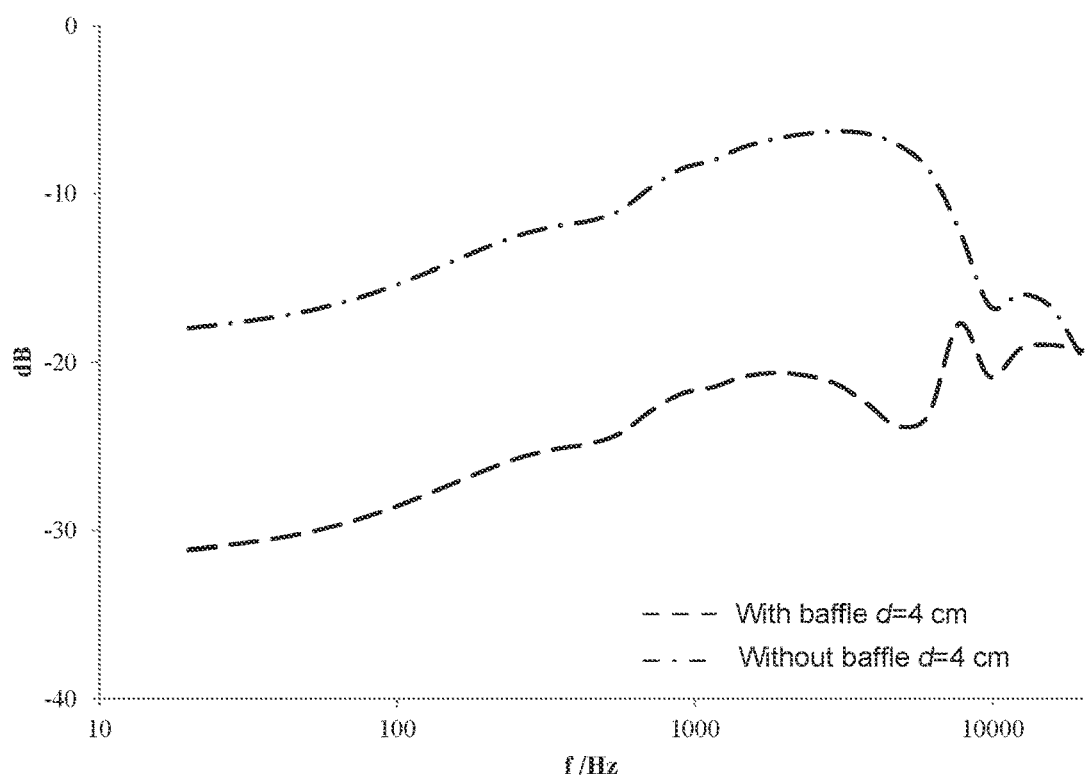
FIG. 20 is a schematic diagram illustrating a sound leakage parameter in a far-field when the distance d between the two-point sound sources is 4 cm.

FIG. 15 is a schematic diagram illustrating exemplary frequency response characteristic curves of two-point sound sources when a distance d between the two-point sound sources is 1 cm. FIG. 16 is a schematic diagram illustrating exemplary frequency response characteristic curves of two-point sound sources when the distance d between the two-point sound sources is 2 cm. FIG. 17 is a schematic diagram illustrating exemplary frequency response characteristic curves of two-point sound sources when the distanced between the two-point sound sources is 4 cm. FIG. 18 is a schematic diagram illustrating a sound leakage parameter in a far-field when the distanced between the two-point sound sources is 1 cm. FIG. 19 is a schematic diagram illustrating a sound leakage parameter in a far-field when the distance d between the two-point sound sources is 2 cm. FIG. 20 is a schematic diagram illustrating a sound leakage parameter in a far-field when the distance d between the two-point sound sources is 4 cm. As shown in FIGS. 15-17, for different distance d (e.g., 1 cm, 2 cm, 4 cm) between sound guiding holes, at a certain frequency, in a listening position in the near-field (e.g., an ear of a user), a volume of a sound generated by two sound guiding holes which may be disposed on two sides of the auricle (i.e., in the case of "without baffle" shown in FIGS. 15-17) may be greater than a volume of a sound generated by two sound guiding holes which may be not disposed on the two sides of the auricle. The certain frequency may be below 10000 Hz, 5000 Hz, or 1000 Hz.

As shown in FIGS. 18-20, for different distances d (e.g., 1 cm, 2 cm, 4 cm, etc.) between sound guiding holes, at a certain frequency, in far-field (e.g., a position away from an ear of a user), a volume of a leaked sound generated by the two sound guiding holes which may be disposed on two sides of an auricle, may be smaller than that generated by the two sound guiding holes which may be not disposed on two sides of the auricle. It should be noted that as the distance between the two sound guiding holes or two-point sound sources increases, the interference cancellation of a sound at a position in the far-field may be weakened, the sound leakage in the far-field may be increased, and reduce the ability of reducing the sound leakage. The distance d between the two sound guiding holes or the two-point sound sources may be not greater than a distance threshold. In some embodiments, the distance d between the two sound guiding holes may be set to be less than 20 cm to increase the volume in the near-field and reduce the sound leakage in the far-field. In some embodiments, the distance d between the two sound guiding holes may be set to be less than 12 cm. In some embodiments, the distance d between the two sound guiding holes may be set to be less than 10 cm. In some embodiments, the distance d between the two sound guiding holes may be set to be less than 6 cm. In some embodiments, considering a size of the acoustic output device and a structural requirement for the sound guiding hole(s), the distance d between the two sound guiding holes may be set to be no less than 1 cm and no greater than 12 cm. In some embodiments, the distance d between the two sound guiding holes may be set to be no less than 1 cm and no more than 10 cm. In some embodiments, the distance d between the two sound guiding holes may be set to be no less than 1 cm and no more than 8 cm. In some embodiments, the distance d between the two sound guiding holes may be set to be no less than 1 cm and no more than 6 cm. In some embodiments, the distance d between the two sound guiding holes may be set to be no less than 1 cm and no more than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of sound guiding holes may be set on two sides of the baffle. The count of the plurality of sound guiding holes disposed on each of the two sides of the baffle may be the same or different. For example, the count of sound guiding holes disposed on one side of the baffle may be two, and the count of sound guiding holes disposed on the other side may be two or three. These modifications and changes may still be within the protection scope of the present disclosure.

In some embodiments, for a certain distance between the two-point sound sources, a relative position of the listening position to the two-point sound sources may affect the volume of the sound in the near-field and the sound leakage in the far-field. To improve the acoustic output performance of the acoustic output device, in some embodiments, the acoustic output device may include at least two sound guiding holes. The at least two sound guiding holes may include two sound guiding holes which may be disposed on a front side and/or a rear side of the auricle of a user, respectively. In some embodiments, a sound propagated from the sound guiding hole disposed on the rear side of the auricle may bypass the auricle to an ear canal of the user, and an acoustic route between the sound guiding hole disposed on the front side of the auricle and the ear canal (i.e., the acoustic distance from the sound guiding hole to an ear canal entrance) may be shorter than an acoustic route between the sound guiding hole disposed on the rear side of the auricle and the ear.

Figure 21:
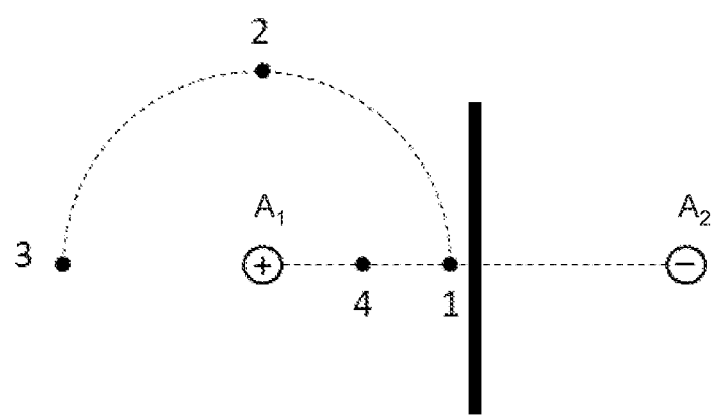
FIG. 21 is a schematic diagram illustrating listening positions according to some embodiments of the present disclosure.

FIG. 21 is a schematic diagram illustrating listening positions according to some embodiments of the present disclosure. In order to further explain an effect of the listening position on the acoustic output, four listening positions (i.e., a listening position 1, a listening position 2, a listening position 3, and a listening position 4) may be selected as shown in FIG. 21, which may be used to describe the effect and criteria of the listening positions. A distance between each of the listening position 1, the listening position 2, and the listening position 3 and a point sound source $A_1$ may be equal, which may be denoted by $r_1$. A distance between the listening position 4 and the point sound source $A_1$ may be denoted by $r_2$, and $r_2<r_1$. The point sound source $A_1$ and a point sound source $A_2$ may generate sounds with opposite phases.

Figure 22:
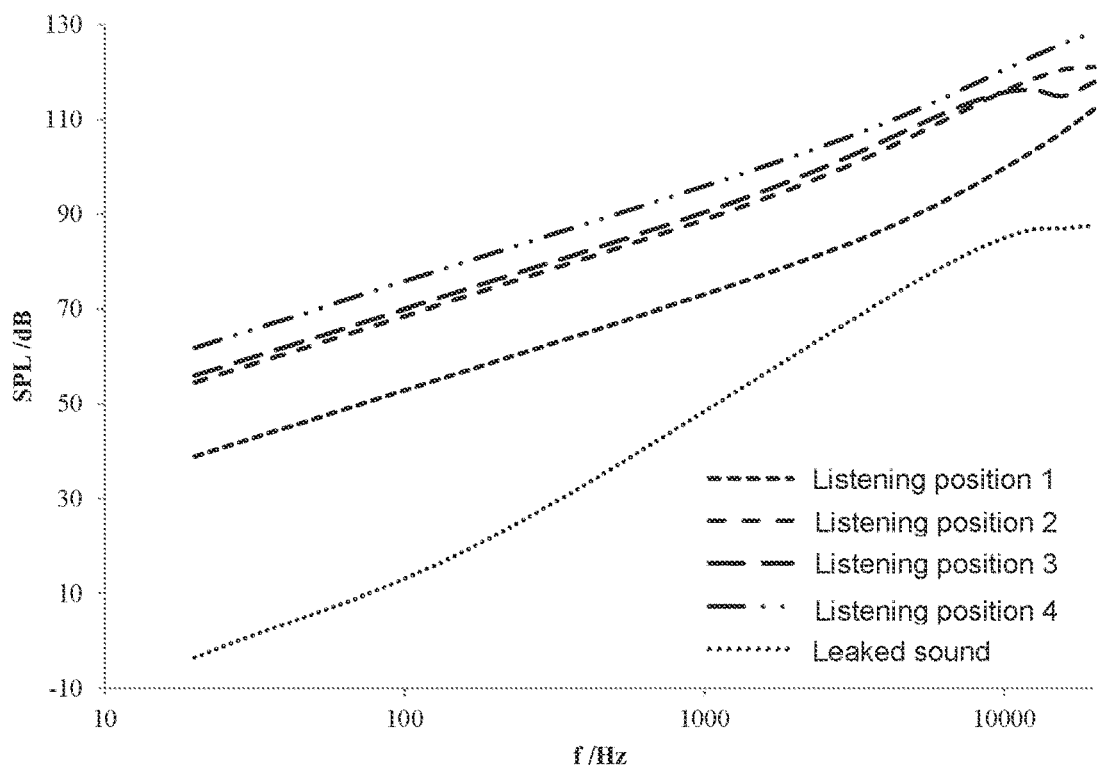
FIG. 22 is a schematic diagram illustrating exemplary frequency response characteristic curves of two-point sound sources in different listening positions in a near-field when a baffle is not disposed between the two-point sound sources according to some embodiments of the present disclosure.
Figure 23:
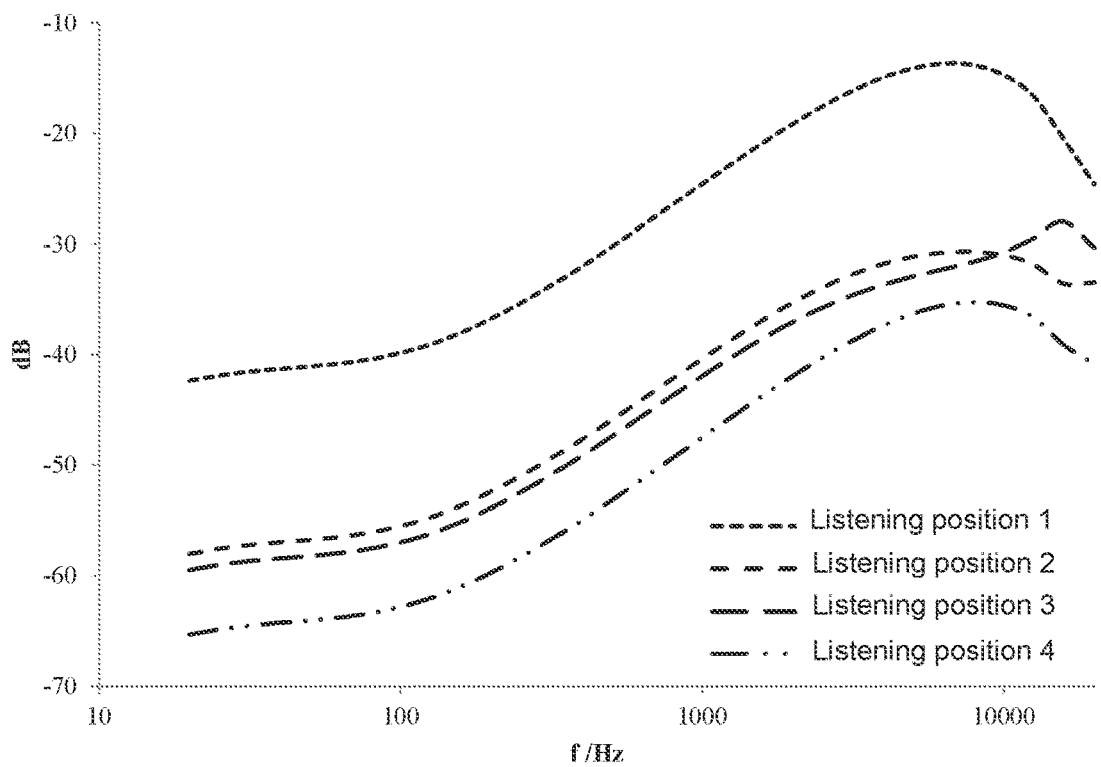
FIG. 23 is a schematic diagram illustrating sound leakage parameters of different listening positions when a baffle is not disposed between the two-point sound sources according to some embodiments of the present disclosure.

FIG. 22 is a schematic diagram illustrating exemplary frequency response characteristic curves of two-point sound sources in different listening positions in the near-field when a baffle is not disposed between the two-point sound sources. FIG. 23 is a schematic diagram illustrating sound leakage parameters of different listening positions, which may be obtained with reference to Equation (4) on the basis of FIG. 22. As shown in FIGS. 22 and 23, an acoustic route difference between an acoustic route from the point sound source $A_1$ to the listening position 1 and an acoustic route from the point sound source $A_2$ to the listening position 1 is relatively small, and accordingly an interference of sounds generated by the two-point sound sources at the listening position 1 may decrease the volume of a heard sound at the listening position 1 to be relatively smaller than that of other listening positions. For a listening position 2, compared with the listening position 1, a distance between the listening position 2 and the point sound source $A_1$ may be the same as that between the listening position 1 and the point sound source $A_1$, that is, an acoustic route from the point sound source $A_1$ to the listening position 2 may be the same as that from the point sound source $A_1$ to the listening position. A distance between the listening position 2 and the point sound source $A_2$ may be longer than that between the listening position 1 and the point sound source $A_2$, and an acoustic route from the point sound source $A_2$ to the listening position 2 may be greater than that from the point sound source $A_2$ to the listening position 1. An amplitude difference between the sound generated by the point sound source $A_1$ and the sound generated by the point sound source $A_2$ may be increased at the listening position 2. Accordingly, a volume of the sound transmitted from the two-point sound sources after being interfered at the listening position 2 may be greater than that at the listening position 1. Among a plurality of positions on an arc with a radius of $r_1$, a difference between the acoustic route from the point sound source $A_1$ to the listening position 3 and the acoustic route from the point sound source $A_2$ to the listening position 3 may be the longer than other acoustic routes. Compared with the listening position 1 and the listening position 2, a volume of a heard sound at the listening position 3 may be higher than that at other listening positions. For the listening position 4, a distance between the listening position 4 and the point sound source $A_1$ may be relatively short, a sound amplitude of a sound generated by the point sound source $A_1$ at the listening position 4 may be greater than the sound amplitude of the sound generated by the point sound source $A_1$ at other listening positions, and a volume of a heard sound at the listening position 4 may be greater than other volumes of heard sounds at other listening positions. In closing, the volume of the heard sound at the listening position in the near-field may be changed when the listening position and/or a relative position of the two-point sound sources are changed. When the listening position (e.g., listening position 3) is on the line between the two-point sound sources and on a same side of the two-point sound sources, the acoustic route difference between the two-point sound sources at the listening position may be the largest (the acoustic route difference may be the distance d between the two-point sound sources). In this case (i.e., when the auricle is not used as a baffle), the volume of the heard sound at the listening position may be greater than that at other positions. According to Equation (4), the sound leakage in the far-field is constant, the sound leakage parameter corresponding to the listening position may be relatively small, and a capability for reducing the sound leakage may be relatively strong. Further, the distance $r_1$ between the listening position (e.g., the listening position 4) and the point source $A_1$ may be decreased, thereby increasing the volume of the heard sound at the listening position, reducing the sound leakage parameter, and improving the capability of reducing sound leakage.

Figure 24:
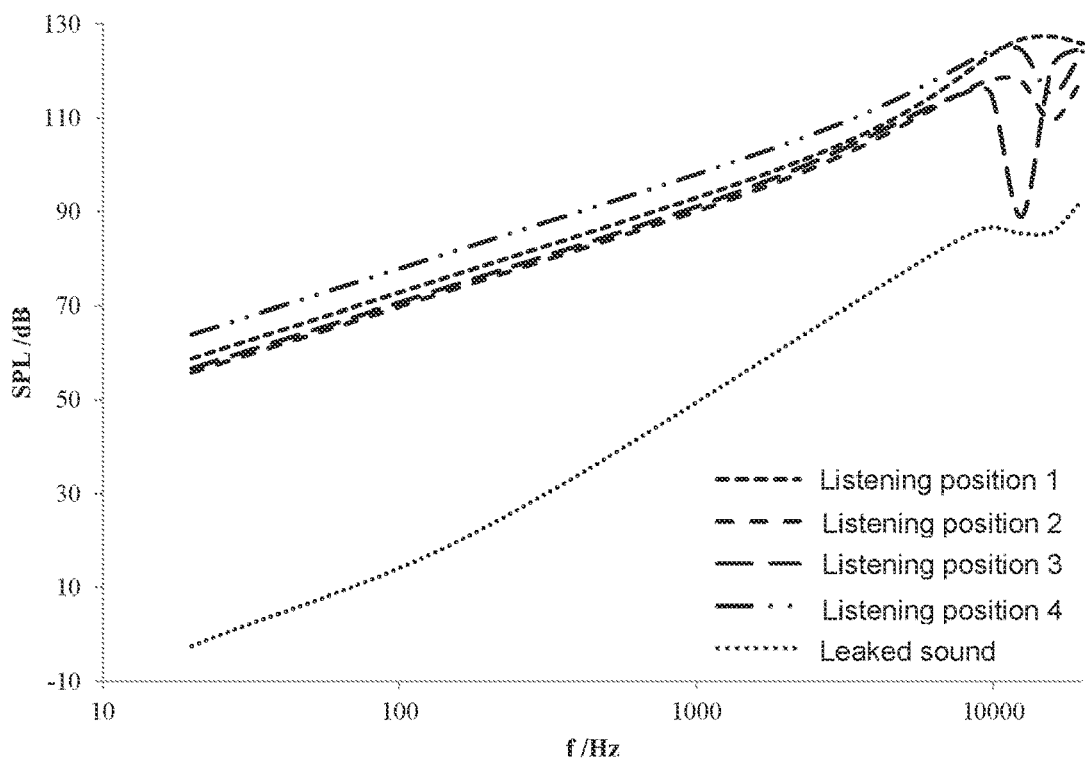
FIG. 24 is a schematic diagram illustrating exemplary frequency response characteristic curves of two-point sound sources in different listening positions in a near-field when a baffle is disposed between the two-point sound sources according to some embodiments of the present disclosure.
Figure 25:
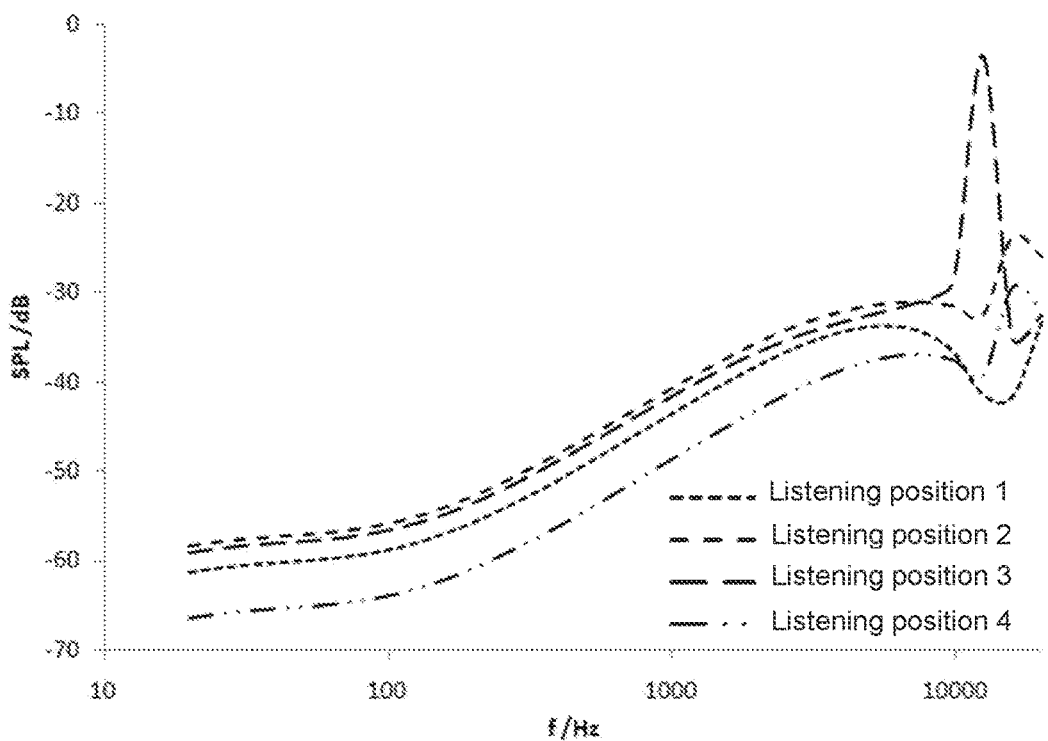
FIG. 25 is a schematic diagram illustrating sound leakage parameters of different listening positions when a baffle is disposed between the two-point sound sources according to some embodiments of the present disclosure.

FIG. 24 is a schematic diagram illustrating exemplary frequency response characteristic curves of two-point sound sources in different listening positions in a near-field when a baffle is disposed between the two-point sound sources(as shown in FIG. 21). FIG. 25 is a graph illustrating sound leakage parameters of different listening positions, which may be obtained with reference to Equation (4) on the basis of FIG. 24. As shown in FIGS. 24 and 25, comparing to a case without a baffle, a volume of a heard sound generated by the two-point sound sources at the listening position 1 may be increased when the baffle is disposed between the two-point sound sources. The volume of the heard sound at the listening position 1 may be greater than that at the listening position 2 and/or the listening position 3. An acoustic route from the point sound source $A_2$ to the listening position 1 may be increased when the baffle is disposed between the two-point sound sources, and accordingly, an acoustic route difference between the two-point sound sources and the listening position 1 may be increased. An amplitude difference between the sounds generated by the two-point sound sources at the listening position 1 may be increased, and the sound interference cancellation may be not formed, thereby increasing the volume of the heard sound generated at the listening position 1. At the listening position 4, a distance between the listening position 4 and the point sound source $A_1$ may be decreased, the sound amplitude of the point sound source $A_1$ at the listening position may be relatively great. The volume of the heard sound at the listening position 4 may be the greater than that at other listening positions (i.e., the listening position 1, the listening position 2, and/or the listening position 3). For the listening position 2 and the listening position 3, an effect of the baffle on the acoustic route from the point sound source $A_2$ to the listening positions may be not obvious, the increase of the volume of the heard sound at the listening position 2 and the listening position 3 may be less than that at the listening position 1 and the listening position 4 which are located close to the baffle.

The volume of leaked sound in the far-field may be not changed, and the volume of the heard sound at the listening position in the near-field may be changed when the listening position is changed. In this case, according to Equation (4), the sound leakage parameter of the acoustic output device may be different at different listening positions. Specifically, a listening position with a relatively large volume of the heard sound (e.g., the listening position 1 and/or the listening position 4) may correspond to a small sound leakage parameter and a strong capability for reducing the sound leakage. A listening position with a low volume of the heard sound (e.g., the listening position 2 and listening position 3) may correspond to a large sound leakage parameter and a weak capability for reducing the sound leakage.

According to an actual application scenario of the acoustic output device, an auricle of a user may be served as the baffle. In this case, the two sound guiding holes on the acoustic output device may be arranged on a front side and a rear side of the auricle, respectively, and an ear canal may be located between the two sound guiding holes as a listening position. In some embodiments, a distance between the sound guiding hole on the front side of the auricle and the ear canal may be smaller than a distance between the sound guiding hole on the rear side of the auricle and the ear canal by adjusting positions of the two sound guiding holes on the acoustic output device. In this case, the acoustic output device may produce a relatively large sound amplitude at the ear canal since the sound guiding hole on the front side of the auricle is close to the ear canal. The sound amplitude formed by the sound guiding hole on the rear side of the auricle may be smaller at the ear canal, which may avoid the interference cancellation of the sounds from the two sound guiding holes at the ear canal, thereby ensuring a relatively large volume of the heard sound at the ear canal. In some embodiments, the acoustic output device may include one or more contact points (e.g., "an inflection point" on a supporting structure to match a shape of the ear) which may contact with the auricle when the acoustic output device is worn. The contact point(s) may be located on a line connecting the two sound guiding holes or on one side of the line connecting the two sound guiding holes. And a ratio of a distance between the sound guiding hole disposed on the front side of the auricle and the contact point(s) and a distance between the sound guiding hole disposed on the rear side of the auricle and the contact point(s) may be 0.05-20. In some embodiments, the ratio may be 0.1-10. In some embodiments, the ratio may be 0.2-5. In some embodiments, the ratio may be 0.4-2.5.

Figure 26:
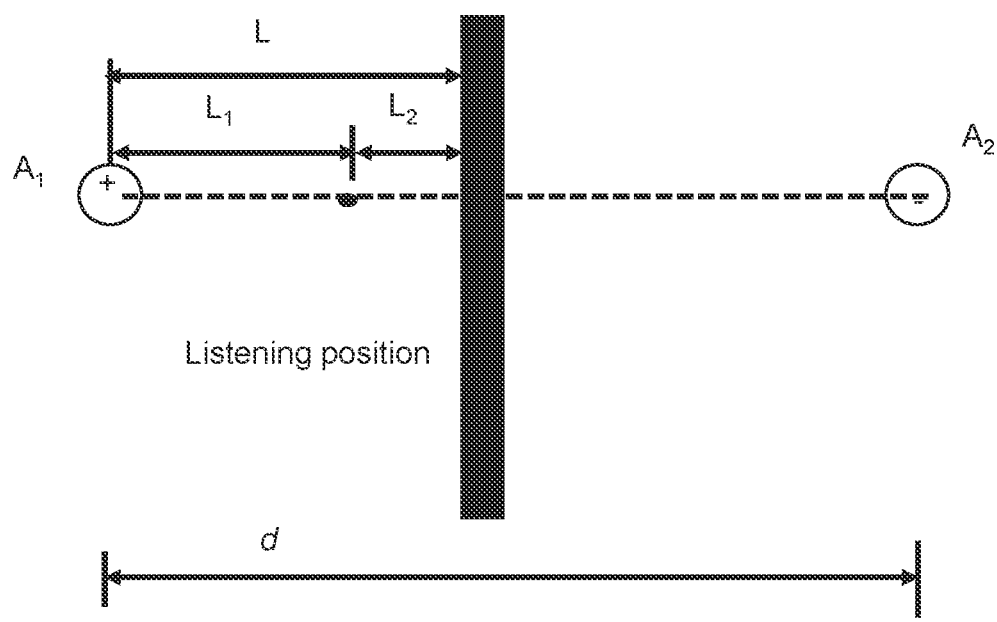
FIG. 26 is a schematic diagram illustrating two-point sound sources and a baffle according to some embodiments of the present disclosure.

FIG. 26 is a schematic diagram illustrating two-point sound sources and a baffle according to some embodiments of the present disclosure. In some embodiments, a position of the baffle disposed between the two sound guiding holes may affect acoustic output of an acoustic output device. Merely by way of example, as shown in FIG. 26, the baffle may be disposed between a point sound source $A_1$ and a point sound source $A_2$, a listening position may be located on a line connecting the point sound source $A_1$ and the point sound source $A_2$. In addition, the listening position may be located between the point sound source $A_1$ and the baffle. A distance between the point sound source $A_1$ and the baffle may be L. A distance between the point sound source $A_1$ and the point sound source $A_2$ may be d. A distance between the point sound source $A_1$ and the heard sound may be $L_1$. A distance between the listening position and the baffle may be $L_2$. When the distance $L_1$ is constant, a movement of the baffle may change a ratio of L to d, and a volume of the heard sound at the listening position and/or a volume of a sound leakage in a far-field may be obtained.

Figure 27:
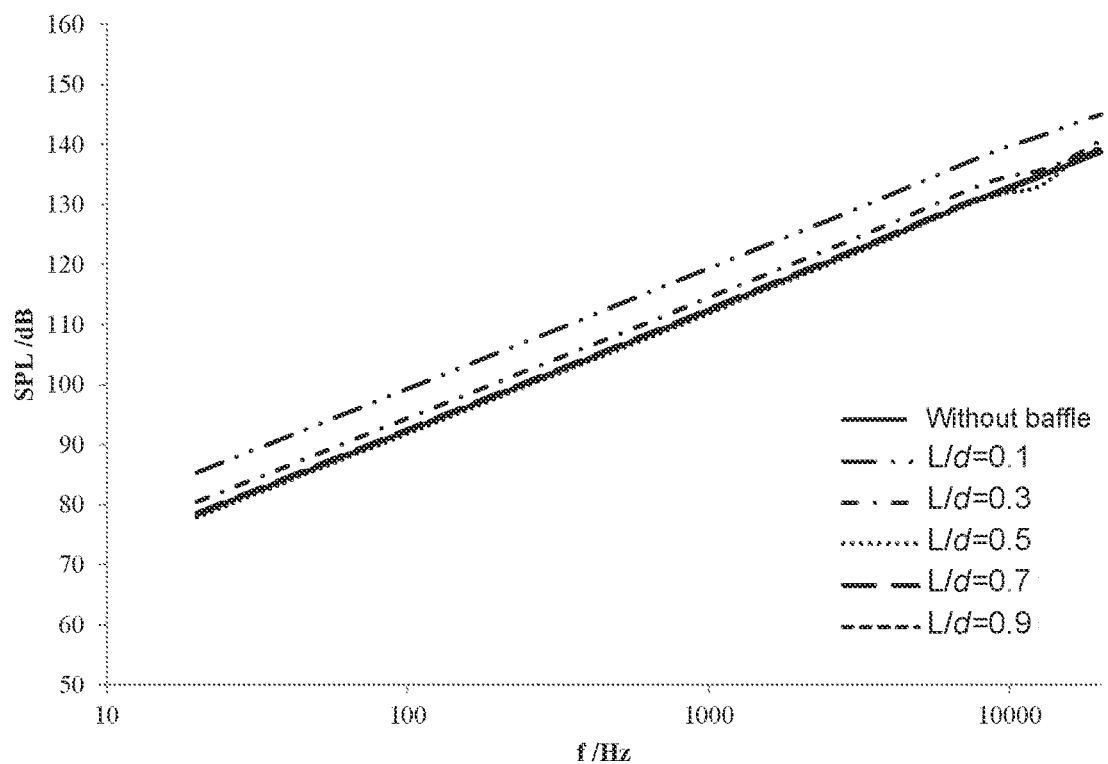
FIG. 27 is a schematic diagram illustrating exemplary frequency response characteristic curves of two-point sound sources in a near-field when a baffle is disposed at different positions according to some embodiments of the present disclosure.
Figure 28:
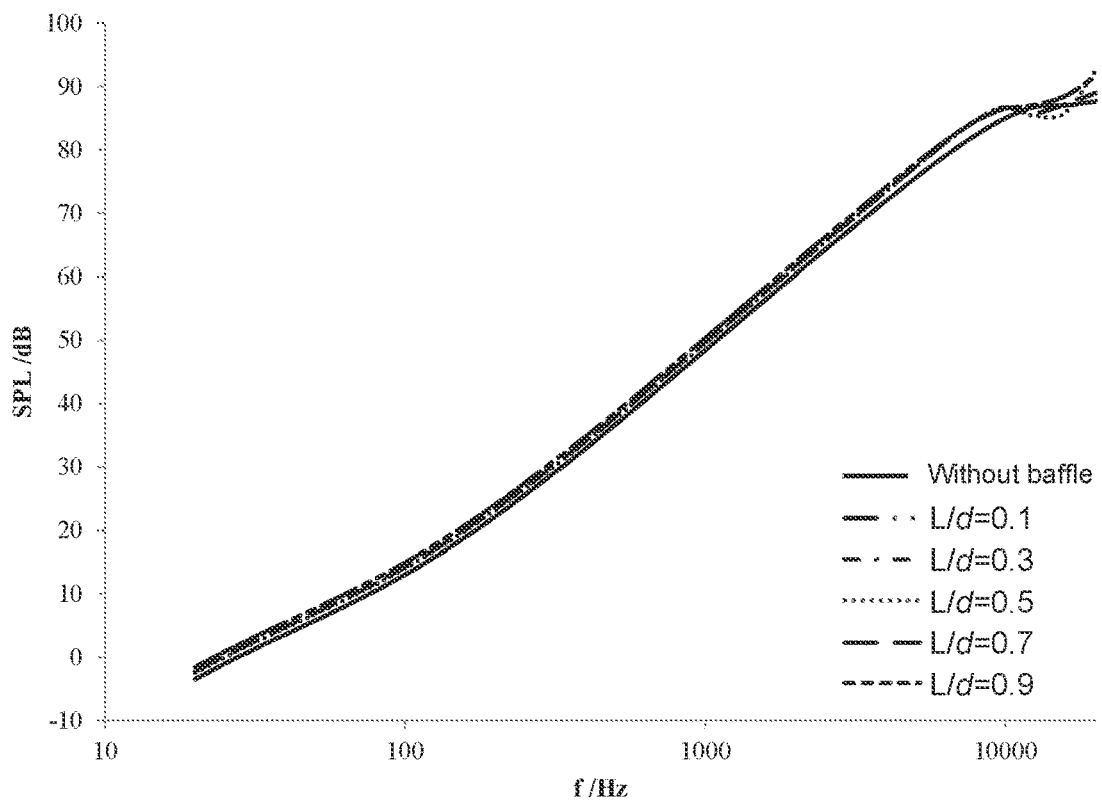
FIG. 28 is a schematic diagram illustrating exemplary frequency response characteristic curves of two-point sound sources in a far-field when a baffle is disposed at different positions according to some embodiments of the present disclosure.
Figure 29:
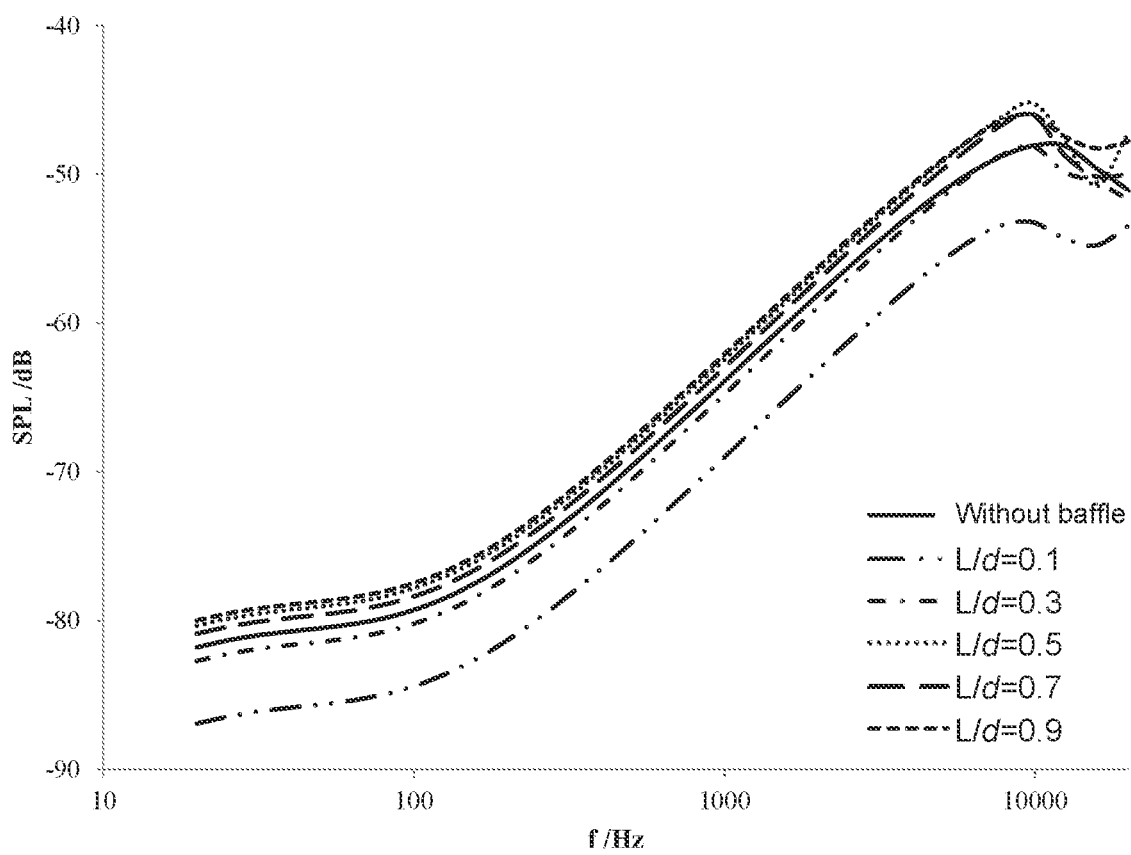
FIG. 29 is a schematic diagram illustrating a sound leakage parameter in a far-field when a baffle is disposed at different positions according to some embodiments of the present disclosure.

FIG. 27 is a schematic diagram illustrating exemplary frequency response characteristic curves of two-point sound sources in a near-field when a baffle is disposed at different positions. FIG. 28 is a schematic diagram illustrating exemplary frequency response characteristic curves of the two-point sound sources in a far-field when the baffle is disposed at different positions. FIG. 29 is a schematic diagram illustrating a sound leakage parameter in the far-field when the baffle is disposed at different positions.

As shown in FIGS. 26-29, the sound leakage in the far-field may be not changed or a change of the sound leakage in the far-field may be less than a sound threshold when the position of the baffle is changed between the two-point sound sources. When a distance d between the point sound source $A_1$ and the point sound source $A_2$ is constant, when L is decreased, a volume of a sound at a listening position may be increased, the sound leakage parameter may be decreased, and the capability for reducing sound leakage may be enhanced. When L increased, the volume at the listening position may be increased, the sound leakage parameter may be increased, and the capability for reducing the sound leakage may be weakened. When L is relatively small, the listening position may be close to the baffle, an acoustic route of a sound wave from the point sound source $A_2$ to the listening position may be increased in the existence of the baffle. In this case, an acoustic route difference between an acoustic route from the point sound source $A_1$ to the listening position and an acoustic route from the point sound source $A_2$ to the listening position may be increased and the interference cancellation of the sound may be reduced. The volume of the sound at the listening position may be increased in the existence of the baffle. When L is relatively large, the listening position may be far away from the baffle. The baffle may not affect (or barely affect) the acoustic route difference. The volume at the listening position may be not changed when the baffle is added.

As described above, by adjusting a position of the sound guiding holes on the acoustic output device, the auricle of the user may be served as the baffle to separate sound guiding holes when the user wears the acoustic output device. In this case, a structure of the acoustic output device may be simplified, and the output effect of the acoustic output device may be further improved. In some embodiments, the positions of the two sound guiding holes may be determined so that a ratio of a distance between the sound guiding hole on the front side of the auricle and the auricle (or a contact point on the acoustic output device for contact with the auricle) to a distance between the two sound guiding holes may be less than or equal to 0.5 when the user wears the acoustic output device. In some embodiments, the ratio of the distance between the sound guiding hole on the front side of the auricle and the auricle to the distance between the two sound guiding holes may be less than or equal to 0.3. In some embodiments, the ratio of the distance between the sound guiding hole on the front side of the auricle and the auricle to the distance between the two sound guiding holes may be less than or equal to 0.1. In some embodiments, the ratio of the distance between the sound guiding hole on the front side of the auricle and the auricle to the distance between the two sound guiding holes may be larger than or equal to 0.05. In some embodiments, a ratio of the distance between the two sound guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output device may affect the volume of the sound in the near-field and sound leakage in the far-field. The acoustic route may be changed by adjusting a length of a chamber between a vibration diaphragm in the acoustic output device and the sound guiding hole. In some embodiments, the acoustic driver may include the vibration diaphragm. A front side and a rear side of the vibration diaphragm may be coupled to two sound guiding holes through a front chamber and a rear chamber, respectively. The acoustic route from the vibration diaphragm to each of the two sound guiding holes may be different. In some embodiments, a ratio of the acoustic route from the vibration diaphragm to one of the two sound guiding holes to the acoustic route from the vibration diaphragm to another of the two sound guiding holes may be 0.5-2. In some embodiments, the ratio may be 0.6-1.5. In some embodiments, the ratio may be 0.8-1.2.

In some embodiments, when the two sound guiding holes transmit the sounds with opposite phases, amplitudes of the sounds may be adjusted to improve the output performance of the acoustic output device. Specifically, the amplitude of the sound transmitted by each of the two sound guiding holes may be adjusted by adjusting an impedance of an acoustic route between the sound guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound guiding holes may be adjusted to change the acoustic resistance of the acoustic route. In some embodiments, a ratio of acoustic impedance between the acoustic driver (e.g., the vibration diaphragm of the acoustic driver) and the two sound guiding holes may be 0.5-2. In some embodiments, the ratio of the acoustic impedance between the acoustic driver and the two sound guiding holes may be 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output device without departing from this principle. For example, the listening position may not be on the line connecting the two-point sound sources, but may also be above, below, or in an extension direction of the line connecting the two-point sound sources. As another example, a method for measuring the distance between a point sound source and the auricle, and a method for measuring the height of the auricle may also be adjusted according to different conditions. These similar changes may be all within the protection scope of the present disclosure.

Figure 30:
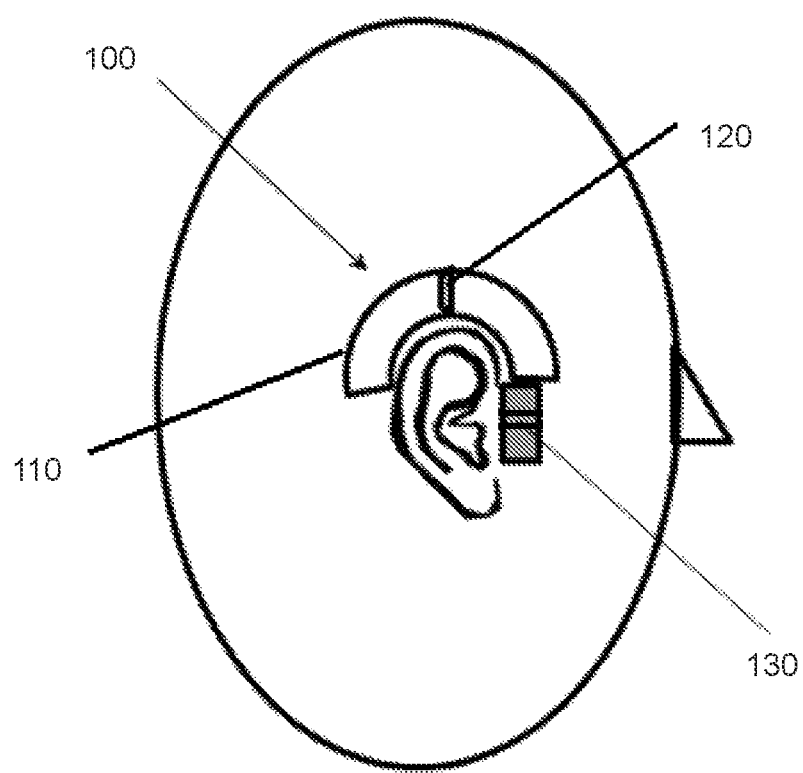
FIG. 30 is a schematic diagram illustrating an exemplary acoustic output device according to some embodiments of the present disclosure.

FIG. 30 is a schematic diagram illustrating an exemplary acoustic output device according to some embodiments of the present disclosure.

For a human ear, a frequency band of a sound can be heard may be in a middle-low-frequency band. An optimization goal of the acoustic output device in the mid-low-frequency bands may be to increase a volume of a heard sound. When a listening position is fixed, parameters of the two-point sound sources may be adjusted to increase the volume of the heard sound and not increase a volume of a leaked sound (e.g., an increase of the volume of the heard sound may be greater than an increase of the volume of the leaked sound). In a high-frequency band, a sound leakage of the two-point sound sources may be not decreased significantly. In the high-frequency band, an optimization goal of the acoustic output device may be reducing the sound leakage. The sound leakage may be further reduced and a leakage-reducing frequency band may be expanded by adjusting the parameters of the two-point sound sources of different frequencies. In some embodiments, the acoustic output device 100 may include an acoustic driver 130. The acoustic driver 130 may output sound through two of the second sound guiding holes. More descriptions regarding the acoustic driver 130, the second sound guiding holes, and a structure therebetween may be described with reference to the acoustic driver 120 and/or the first sound guiding holes and the relevant descriptions thereof. In some embodiments, the acoustic driver 130 and the acoustic driver 120 may output sounds with different frequencies, respectively. In some embodiments, the acoustic output device 100 may include a controller configured to cause the acoustic driver 120 to output a sound within a first frequency range, and cause the acoustic driver 130 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 120 may be a low-frequency speaker, and the acoustic driver 130 may be a middle-high-frequency speaker. Due to different frequency response characteristics of the low-frequency speaker and the middle-high-frequency speaker, frequency bands of sounds output by the acoustic driver 120 and the acoustic driver 130 may also be different. A high-frequency band and a low-frequency band may be divided using the low-frequency speaker and the middle-high-frequency speaker, and accordingly, two-point sound sources with low-frequency and two-point sound sources middle-high-frequency may be constructed to output sound in the near-field output and/or reduce sound leakage in the far-field. For example, the two-point sound sources for outputting low-frequency sound may be formed when the acoustic driver 120 outputs the low-frequency sound through the sound guiding hole 111 and the sound guiding hole 112 shown in FIG. 1. The two-point sound sources with low-frequency may be disposed on two sides of an auricle to increase a volume heard by an ear near the near-field. Two-point sound sources for outputting middle-high-frequency sound may be formed when the acoustic driver 130 outputs the middle-high-frequency sound through two second sound guiding holes. A middle-high-frequency sound leakage may be reduced by adjusting a distance between the two second sound guiding holes. The two-point sound sources with middle-high-frequency may be disposed on two sides of the auricle, or the same side of the auricle. Alternatively, the acoustic driver 120 may provide two-point sound sources for outputting full-frequency sound through the sound guiding hole 111 and the sound guiding hole 112 to increase the volume of the sound in the near-field.

Figure 31:
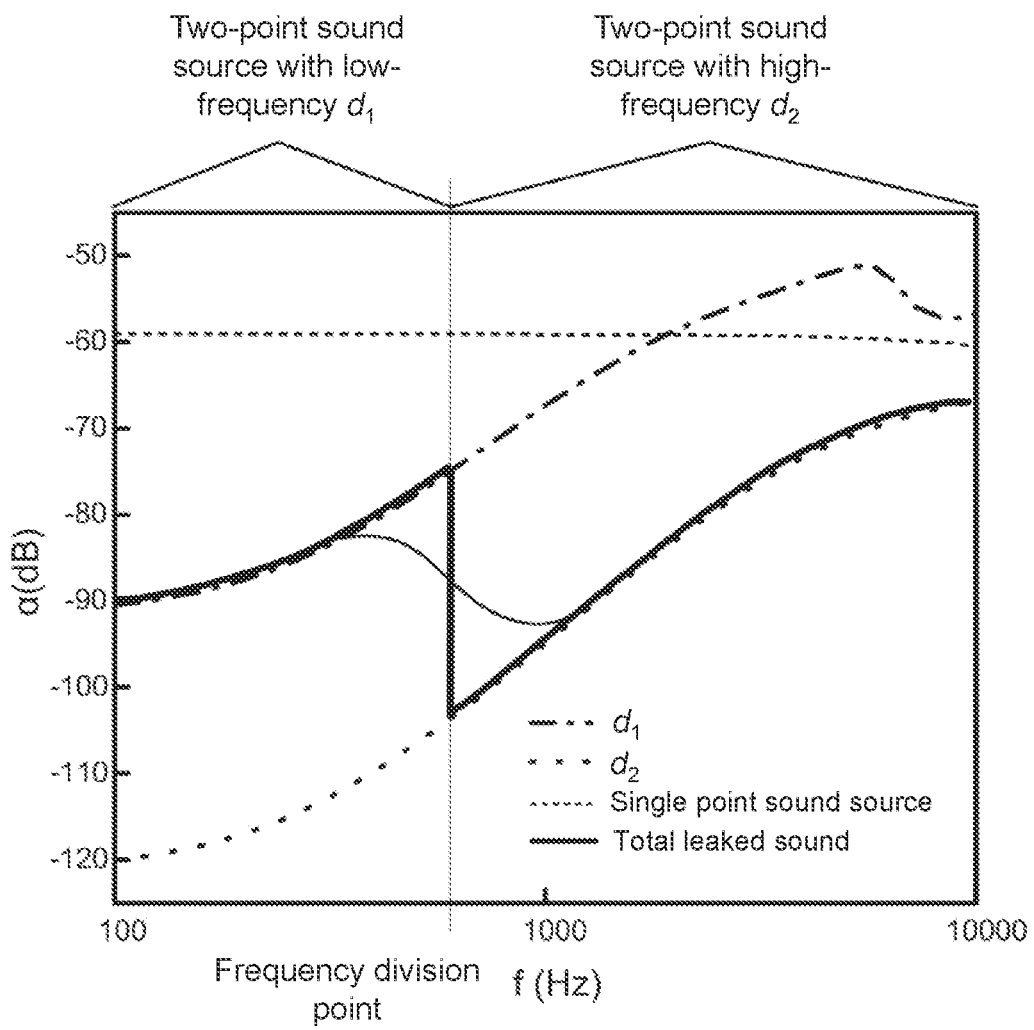
FIG. 31 is a schematic diagram illustrating sound leakage parameters when a two-point sound sources with a low-frequency and two-point sound sources with a high-frequency are worked together according to some embodiments of the present disclosure.

Further, a distance $d_2$ between the two second sound guiding holes may be less than a distance $d_1$ between the sound guiding hole 111 and the sound guiding holes 112, that is, $d_1$ may be larger than $d_2$. FIG. 31 is a schematic diagram illustrating sound leakage parameters when a two-point sound sources with a low-frequency and two-point sound sources with a high-frequency are worked together. As shown in FIG. 31, two sets of two-point sound sources may be disposed to improve the sound leakage reduction capability of the acoustic output device which may be better than that of an acoustic output device 100 with a single-point sound source, and distances between the two-point sound sources in the two sets of two-point sound sources may be different. In the low-frequency range, by setting the distance (e.g., increasing the distance) of the two-point sound sources with low-frequency, the increase of a volume of a heard sound may be greater than the increase of a volume of sound leakage, and a relatively high volume of the sound in the low-frequency band in the near-field. In the low-frequency range, the sound leakage of the two-point sound sources may originally be relatively small. After the distance between the two-point sound sources is changed (e.g., increasing the distance), a slight increase of the sound leakage may still maintain a low level (e.g., a sound leakage parameter a may be even further reduced). In the high-frequency range, by setting the distance of the two-point sound sources (e.g., decreasing the distance), a problem such as a cutoff frequency of the high-frequency for reducing the sound leakage is relatively low, the frequency band for reducing the sound leakage is relatively narrow, or the like, or any combination thereof, may be overcome. The performance of the acoustic output device for reducing the sound leakage in a higher-frequency band may be improved, and the requirement for an open ear acoustic output device may be met.

It should be noted that the sound leakage reduction curve shown in FIG. 31 may indicate an ideal case, and is only for explaining the principle and/or effect. The sound leakage curve may also be affected by one or more factors such as filter characteristics of an actual circuit, frequency characteristics of a transducer, and frequency characteristics of an acoustic channel, an actual low-frequency and/or high-frequency sounds of the acoustic output device may be different from that shown in FIG. 31. A frequency band of a sound with the low-frequency and a frequency band of a sound with the high-frequency may be overlapped (e.g., aliased) near a frequency division point, and the sound leakage reduction curve of the acoustic output device may not include a mutation at the frequency division point as shown in FIG. 31. A gradient and/or a transition may exist near the frequency division point denoted as a thin solid line in FIG. 31.

In some embodiments, the two second sound guide holes may output sounds with a phase difference. Preferably, the two second sound guide holes output sounds with an opposite phase difference. More descriptions regarding that the acoustic driver 130 outputs sounds with phase difference from the second sound guide hole may refer to the description of the acoustic driver 120 which may output sound(s) from the sound guide hole.

It should be noted that the position of the sound guiding holes of the acoustic output device may not be limited to the case that the two sound guiding holes 111 and 112 corresponding to the acoustic driver 120 shown in FIG. 30 are disposed on the two sides of the auricle, and the case that the two sound guiding holes corresponding to the acoustic driver 130 are disposed on the front side of the auricle. For example, in some embodiments, the two second sound guiding holes corresponding to the acoustic driver 130 may be disposed on the same side of the auricle (e.g., a rear side, an upper side, or a lower side of the auricle). As another example, the two second sound guiding holes corresponding to the acoustic driver 130 may be disposed on two sides of the auricle. In some embodiments, when the sound guiding holes 111 and the sound guiding hole 112 and/or the two second sound guiding holes are disposed on the same side of the auricle, a baffle may be disposed between the sound guiding holes 111 and the sound guiding hole 112 and/or the two second sound guiding holes to further increase the volume of the sound in the near-field and reduce the sound leakage in the far-field. As yet another example, the two sound guiding holes corresponding to the acoustic driver 120 may be disposed on the same side of the auricle (e.g., the front side, the rear side, the upper side, the lower side, etc. of the auricle).

Figure 32:
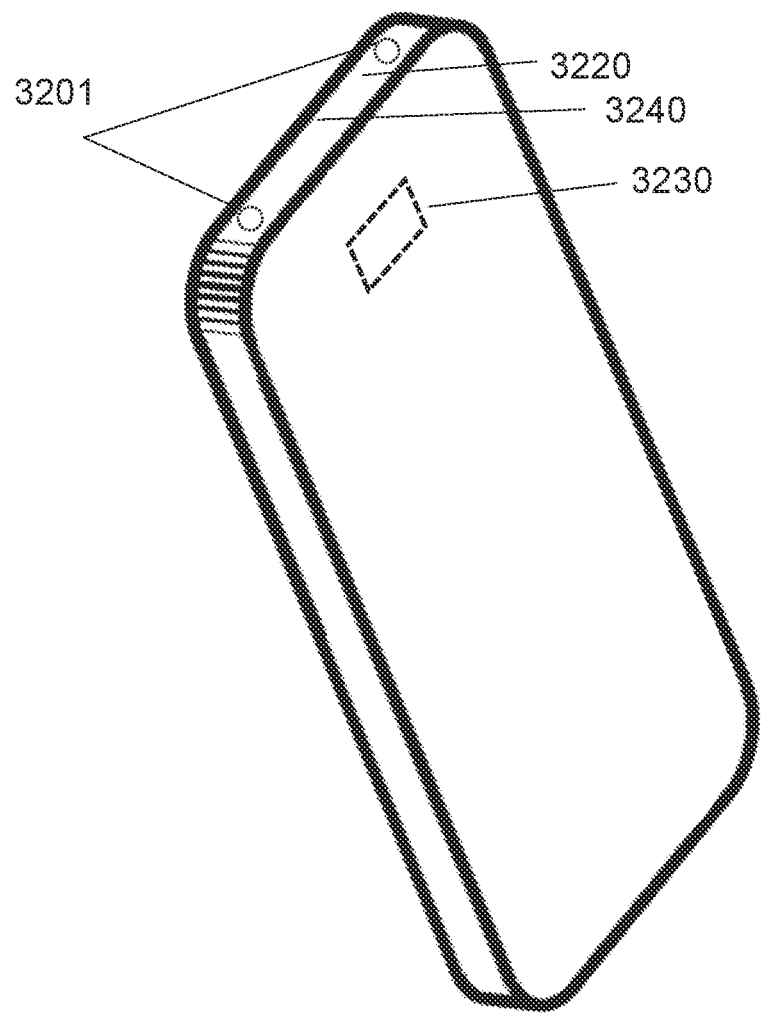
FIG. 32 is a schematic diagram illustrating a mobile phone with sound guiding holes according to some embodiments of the present disclosure.

It should be noted that the descriptions of the present disclosure do not limit the actual use scenario of the acoustic output device. The acoustic output device may be any apparatus or a part thereof that outputs a sound to a user. For example, the acoustic output device may be applied on a mobile phone. FIG. 32 is a schematic diagram illustrating a mobile phone with sound guiding holes according to some embodiments of the present disclosure. As shown in FIG. 32, a top 3220 of the mobile phone 3200 (i.e., an upper surface of the mobile phone "vertical" to a display screen of the mobile phone) may include a plurality of sound guiding holes as described elsewhere in the present disclosure. Merely by way of example, a sound guiding hole 3201 may include a set of two-point sound sources (or a point sound source array) for outputting the sound. A first sound guiding hole in the sound guiding holes 3201 may be close to a left end of the top 3220, and a second sound guiding hole may be close to a right end of the top 3220. A distance may be formed between the two sound guiding holes. An acoustic driver 3230 may be disposed in a casing of the mobile phone 3200. The sound generated by the acoustic driver 3230 may be transmitted outward through the sound guiding hole 3201.

In some embodiments, two sound guiding holes 3201 may emit a group of sounds with a same (or substantially the same) phase and/or a same (or substantially same) amplitude. When the user places the mobile phone near the ear to answer voice information, the sound guiding hole 3201 may be located on two sides of an ear of the user, which may be equivalent to that an acoustic route difference may be added by two acoustic routes from one of the sound guiding hole 3201 to the ear of the user according to some embodiments of the present disclosure. The sound guiding holes 3201 may emit a relatively strong sound in the near-field to the user, and the ear of the user may barely affect the sound radiated by the sound guiding hole 3201 in the far-field. The sound guiding hole 3201 may reduce the sound leakage to the surroundings due to an interference cancellation of the sounds. In addition, by setting the sound guiding hole 3201 on the top of the mobile phone instead of an upper end of the display screen of the mobile phone, the space for setting the sound guiding hole 3201 on the front of the mobile phone may be saved, the area of the display screen of the mobile phone may be saved, and the appearance of the mobile phone may be optimized.

It should be noted that the above description of setting the sound guiding hole 3201 on the mobile phone is just for the purpose of illustration. Without departing from the principle, those skilled in the art may make adjustment to the structure, and the adjusted structure may still be within the protection scope of the present disclosure. For example, all or part of the sound guiding hole 3201 may be set on other positions of the mobile phone 3200, which may still ensure that the user can hear a relatively large volume when receiving the sound information, and also prevent the leakage of the sound information to the surroundings. For example, the first sound guiding hole may be set on the top 3220 (closer to the ear of the user), and the second sound guiding hole may be set at a back or a side (away from the ear of the user) of the mobile phone 3200. When the user places the first sound guiding hole near the ear to answer the voice information, the casing of the mobile phone 3200 may be served as a "baffle" which may be disposed between the second sound guiding hole and the ear of the user, thereby increasing the acoustic route of the second sound guiding hole to the ear of the user, and increasing the volume of sound heard by the user. For another example, an acoustic driver configured to output sounds with different frequency ranges may be disposed in the casing of the mobile phone 3200. The baffle may be or may not be disposed between the sound guiding holes corresponding to the acoustic driver according to some embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An acoustic output device, comprising:
   at least one acoustic driver configured to generate a sound and output the sound through at least two sound guiding holes; and
   a supporting structure configured to support the at least one acoustic driver and disposing the at least two sound guiding holes on two sides of an auricle of a user, respectively, the auricle of the user increasing a distance difference between two acoustic paths that the sound is transmitted from the sound guiding holes on two sides of an auricle of the user to the user's ear canal.

2. The acoustic output device of claim 1, wherein
   the at least one acoustic driver comprises a vibration diaphragm,
   a front chamber configured to radiate the sound is disposed on the supporting structure in front of the vibration diaphragm,
   a rear chamber configured to radiate the sound is disposed on the supporting structure behind the vibration diaphragm,
   the front chamber is acoustically coupled with a first sound guiding hole of the at least two sound guiding holes, and
   the rear chamber is acoustically coupled with a second sound guiding hole of the at least two sound guiding holes.

3. The acoustic output device of claim 1, wherein the at least two sound guiding holes output the sound with a phase difference.

4. The acoustic output device of claim 3, wherein the at least two sound guiding holes output the sound with opposite phases.

5. The acoustic output device of claim 1, wherein a distance d between the at least two sound guiding holes is between 1 cm and 12 cm.

6. The acoustic output device of claim 1, wherein
   the at least two sound guiding holes include two sound guiding holes, the two sound guiding holes being disposed on a front side and a rear side of the auricle of the user, respectively, and
   an acoustic route between a first sound guiding hole of the two sound guiding holes, which is disposed on the front side of the auricle of the user and an ear of the user is shorter than an acoustic route between a second sound guiding hole which is disposed on the rear side of the auricle of the user and the ear of the user.

7. The acoustic output device of claim 1, wherein
   the at least two sound guiding holes include two sound guiding holes, the two sound guiding holes being disposed on a front side and a rear side of an auricle of the user, respectively, and
   a ratio of a distance between a sound guiding hole disposed on the front side of the auricle of the user and the auricle and a distance between the at least two sound guiding holes is not greater than 0.5.

8. The acoustic output device of claim 1, wherein
   the at least one acoustic driver comprises a vibration diaphragm, and
   acoustic routes between the vibration diaphragm and the at least two sound guiding holes are different.

9. The acoustic output device of claim 8, wherein a ratio of the acoustic routes between the vibration diaphragm and the at least two sound guiding holes is 0.5-2.

10. The acoustic output device of claim 8, wherein sounds generated by the at least one acoustic driver at the at least two sound guiding holes have different sound pressure amplitudes.

11. The acoustic output device of claim 8, wherein structures between the at least two sound guiding holes and the at least one acoustic driver have different acoustic impedance.

12. The acoustic output device of claim 1, further comprising:
    at least one second acoustic driver configured to output sound through at least two second sound guiding holes, and the at least two second sound guiding holes being disposed on a same side of the auricle of the user.

13. The acoustic output device of claim 12, wherein the at least two second sound guiding holes are disposed on a front side of the auricle of the user.

14. The acoustic output device of claim 12, further comprising:
    a controller configured to cause the at least one acoustic driver to output a sound within a first frequency range, and cause the at least one second acoustic driver to output a sound within a second frequency range, a frequency within the second frequency range being higher than that within the first frequency range.

15. The acoustic output device of claim 14, wherein a distance between the at least two second sound guiding holes is less than a distance between the at least two sound guiding holes.

16. The acoustic output device of claim 12, wherein the at least two second sound guiding holes output sounds with a phase difference.

17. The acoustic output device of claim 16, wherein the at least two second sound guiding holes output sounds with an opposite phase difference.

18. The acoustic output device of claim 12, wherein at least one of the at least two sound guiding holes or the at least two second sound guiding holes are disposed on the supporting structure.

19. The acoustic output device of claim 1, wherein the supporting structure comprises a casing structure.

20. The acoustic output device of claim 1, further comprising a baffle disposed between the at least two sound guiding holes.

* * * * *